US010661858B2

(12) United States Patent
Mano

(10) Patent No.: US 10,661,858 B2
(45) Date of Patent: May 26, 2020

(54) ELECTRIC-MOTOR-ASSISTED BICYCLE

(71) Applicant: YAMAHA HATSUDOKI KABUSHIKI KAISHA, Iwata-shi, Shizuoka (JP)

(72) Inventor: Yasunori Mano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/453,969

(22) Filed: Mar. 9, 2017

(65) Prior Publication Data

US 2017/0313381 A1 Nov. 2, 2017

(30) Foreign Application Priority Data

Apr. 28, 2016 (JP) .................................. 2016-091467

(51) Int. Cl.
*B62M 6/55* (2010.01)
*B62M 6/50* (2010.01)
(Continued)

(52) U.S. Cl.
CPC .............. *B62M 6/55* (2013.01); *B62K 19/34* (2013.01); *B62K 25/286* (2013.01); *B62K 25/30* (2013.01);
(Continued)

(58) Field of Classification Search
CPC . B62M 6/55; B62M 6/50; B62M 6/90; B62M 11/02; B62K 19/34; B62K 25/286; B62K 25/30
See application file for complete search history.

(56) References Cited

U.S. PATENT DOCUMENTS 5,341,892 A * 8/1994 Hirose ..................... B62M 6/60
180/220
5,570,752 A * 11/1996 Takata ..................... B62M 6/45
180/206.2
(Continued)

FOREIGN PATENT DOCUMENTS

CN 1171352 A 1/1998
CN 1172048 A 2/1998
(Continued)

OTHER PUBLICATIONS

Official Communication issued in corresponding European Patent Application No. 17160074.5, dated Sep. 25, 2017.
(Continued)

*Primary Examiner* — Jacob D Knutson
*Assistant Examiner* — Michael R Stabley
(74) *Attorney, Agent, or Firm* — Keating & Bennett, LLP

(57) ABSTRACT

An electric-motor-assisted bicycle includes a vehicle-body frame and a drive unit including two couplers. The vehicle-body frame includes a bracket and a pair of chain stays. The drive unit is attached to the bracket. Each of the chain stays is attached to a position on the bracket rearward of a crank axle in the front/rear direction of the bicycle. One coupler is forward of the crank axle in the front/rear direction of the bicycle. The other coupler is rearward of the crank axle in the front/rear direction of the bicycle. At least one of a region of the bracket to which the chain stay is attached and a region of the bracket to which the other coupler is attached does not overlap a line segment connecting a shaft center of the axle of the rear wheel to a shaft center of the crank axle.

15 Claims, 13 Drawing Sheets

(51) Int. Cl.
*B62M 11/02* (2006.01)
*B62M 6/90* (2010.01)
*B62K 19/34* (2006.01)
*B62K 25/28* (2006.01)
*B62K 25/30* (2006.01)

(52) U.S. Cl.
CPC ............. *B62M 6/50* (2013.01); *B62M 6/90* (2013.01); *B62M 11/02* (2013.01)

(56) References Cited

U.S. PATENT DOCUMENTS

| | | | | |
|---|---|---|---|---|
| 5,749,429 | A * | 5/1998 | Yamauchi | B62M 6/45 180/206.2 |
| 5,758,736 | A * | 6/1998 | Yamauchi | B62M 6/45 180/206.4 |
| 5,826,675 | A | 10/1998 | Yamamoto | |
| 5,845,727 | A * | 12/1998 | Miyazawa | B62M 6/55 180/206.4 |
| 5,909,781 | A * | 6/1999 | Yonekawa | B62M 6/55 180/206.4 |
| 5,915,493 | A | 6/1999 | Nakayama | |
| 5,937,962 | A * | 8/1999 | Yokoyama | B62M 6/10 180/205.4 |
| 6,073,717 | A | 6/2000 | Yamamoto et al. | |
| 6,321,863 | B1 * | 11/2001 | Vanjani | B60K 7/0007 180/65.51 |
| 6,516,908 | B2 * | 2/2003 | Tseng | B62M 6/55 180/206.2 |
| 6,591,929 | B1 * | 7/2003 | Tsuboi | B62M 6/70 180/206.4 |
| 6,964,313 | B2 * | 11/2005 | Phillips, III | B62M 6/60 180/206.5 |
| 8,640,805 | B2 * | 2/2014 | Kuroki | B62M 6/45 180/205.1 |
| 8,657,047 | B2 * | 2/2014 | Urabe | B62M 6/65 180/65.51 |
| 8,708,084 | B2 * | 4/2014 | Kuroki | B62M 6/50 180/205.1 |
| 8,777,791 | B1 * | 7/2014 | Hino | B62M 6/55 180/206.4 |
| 9,302,734 | B2 * | 4/2016 | Getta | B62M 6/55 |
| 9,315,231 | B2 * | 4/2016 | Gingl | B62M 6/55 |
| 2012/0161495 | A1 * | 6/2012 | Ito | B62M 6/65 301/6.5 |
| 2014/0166384 | A1 | 6/2014 | Ishida et al. | |
| 2014/0210318 | A1 | 7/2014 | Yao | |
| 2015/0101874 | A1 | 4/2015 | Getta et al. | |

FOREIGN PATENT DOCUMENTS

| | | | | |
|---|---|---|---|---|
| CN | 104010936 A | | 8/2014 | |
| CN | 204527510 U | | 8/2015 | |
| DE | 20 2011 106 258 U1 | | 3/2012 | |
| DE | WO 2013/050193 | * | 4/2013 | ............ B62K 19/18 |
| DE | 10 2013 107 623 A1 | | 1/2015 | |
| DE | 10 2013 107623 | * | 1/2015 | ............ B62K 19/34 |
| EP | 0 802 109 A1 | | 10/1997 | |
| EP | 2 409 908 A1 | | 1/2012 | |
| EP | 2 743 169 A1 | | 6/2014 | |
| EP | 2 759 464 A1 | | 7/2014 | |
| EP | 2 783 972 A1 | | 10/2014 | |
| EP | 2 957 495 A1 | | 12/2015 | |
| EP | 3 323 703 A1 | | 5/2018 | |
| JP | 08-244673 A | | 9/1996 | |
| JP | H08 244673 | * | 9/1996 | ............ B62M 6/45 |
| JP | 09-183394 A | | 7/1997 | |
| JP | 09-277977 A | | 10/1997 | |
| JP | 10-16857 A | | 1/1998 | |
| JP | 10-16870 A | | 1/1998 | |
| JP | 10-16872 A | | 1/1998 | |
| JP | 2001-088769 A | | 4/2001 | |
| JP | 2014-139065 A | | 7/2014 | |
| JP | 2014-144768 A | | 8/2014 | |
| JP | 2014-196080 A | | 10/2014 | |
| JP | 2014-528377 A | | 10/2014 | |
| WO | 2013/050193 A1 | | 4/2013 | |

OTHER PUBLICATIONS

Official Communication issued in Chinese Patent Application No. 201710135451.X, dated Feb. 3, 2019.

\* cited by examiner

ELECTRIC-MOTOR-ASSISTED BICYCLE

CROSS REFERENCE TO RELATED APPLICATIONS

This application claims the benefit of priority to Japanese Patent Application No. 2016-091467 filed on Apr. 28, 2016. The entire contents of this application are hereby incorporated herein by reference.

BACKGROUND OF THE INVENTION

1. Field of the Invention

The present invention relates to electric-motor-assisted bicycles, and more particularly to electric-motor-assisted bicycles including a drive unit attached to a vehicle-body frame.

2. Description of the Related Art

Bicycles are used by many people, regardless of age and gender, as a handy transportation means. In recent years, electric-motor-assisted bicycles that add motor driving forces to rider pedaling forces to assist the rider have become popular. Such an electric-motor-assisted bicycle is disclosed in JP 2014-196080 A, for example.

JP 2014-196080 A describes an electric-motor-assisted bicycle that includes a drive unit. The drive unit includes a crank axle. Pedals are mounted on the crank axle by arms. The drive unit is attached to a bottom of a vehicle-body frame.

SUMMARY OF THE INVENTION

A drive unit was not present in conventional bicycles. For bicycles where travelling performance is important, such as racing bicycles, the drive unit may be considered an obstacle and may decrease travelling performance. For example, a distance between a shaft center of a crank axle and a shaft center of an axle of the rear wheel, as viewed from a side of the vehicle (hereinafter referred to as rear/center length), may increase.

Preferred embodiments of the present invention significantly reduce or minimize an increase of the rear/center length in an electric-motor-assisted bicycle including the drive unit which is attached to the vehicle-body frame.

The electric-motor-assisted bicycle according to a preferred embodiment of the present invention includes a front wheel, a rear wheel, a vehicle body frame, and a drive unit. The rear wheel is located rearward of the front wheel. The vehicle-body frame supports the front and rear wheels. The drive unit is attached to the vehicle-body frame. The drive unit generates a driving force to be transmitted to the rear wheel. The drive unit includes a housing, two attachment portions and a crank axle. The two attachment portions are provided on an outer surface of the housing. The two attachment portions attach the housing to the vehicle-body frame. The two attachment portions include a first attachment portion and a second attachment portion. The crank axle extends through the housing in a left/right direction with respect to the bicycle. The vehicle-body frame includes a bracket and a chain stay. The drive unit is attached to the bracket. The chain stay is attached to the bracket at a position rearward of the crank axle in a front/rear direction with respect to the bicycle. The chain stay extends from the bracket rearwardly with respect to the bicycle to support an axle of the rear wheel. The first attachment portion is located forward of the crank axle in the front/rear direction with respect to the bicycle. The second attachment portion is located rearward of the crank axle in the front/rear direction with respect to the bicycle. At least one of a region in the bracket to which the chain stay is attached and a region in the bracket to which the second attachment portion is attached does not overlap a line segment connecting a shaft center of the axle of the rear wheel to a shaft center of the crank axle as viewed from a side of the bicycle.

Electric-motor-assisted bicycles of preferred embodiments of the present invention significantly reduce or minimize increases in the rear/center length.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
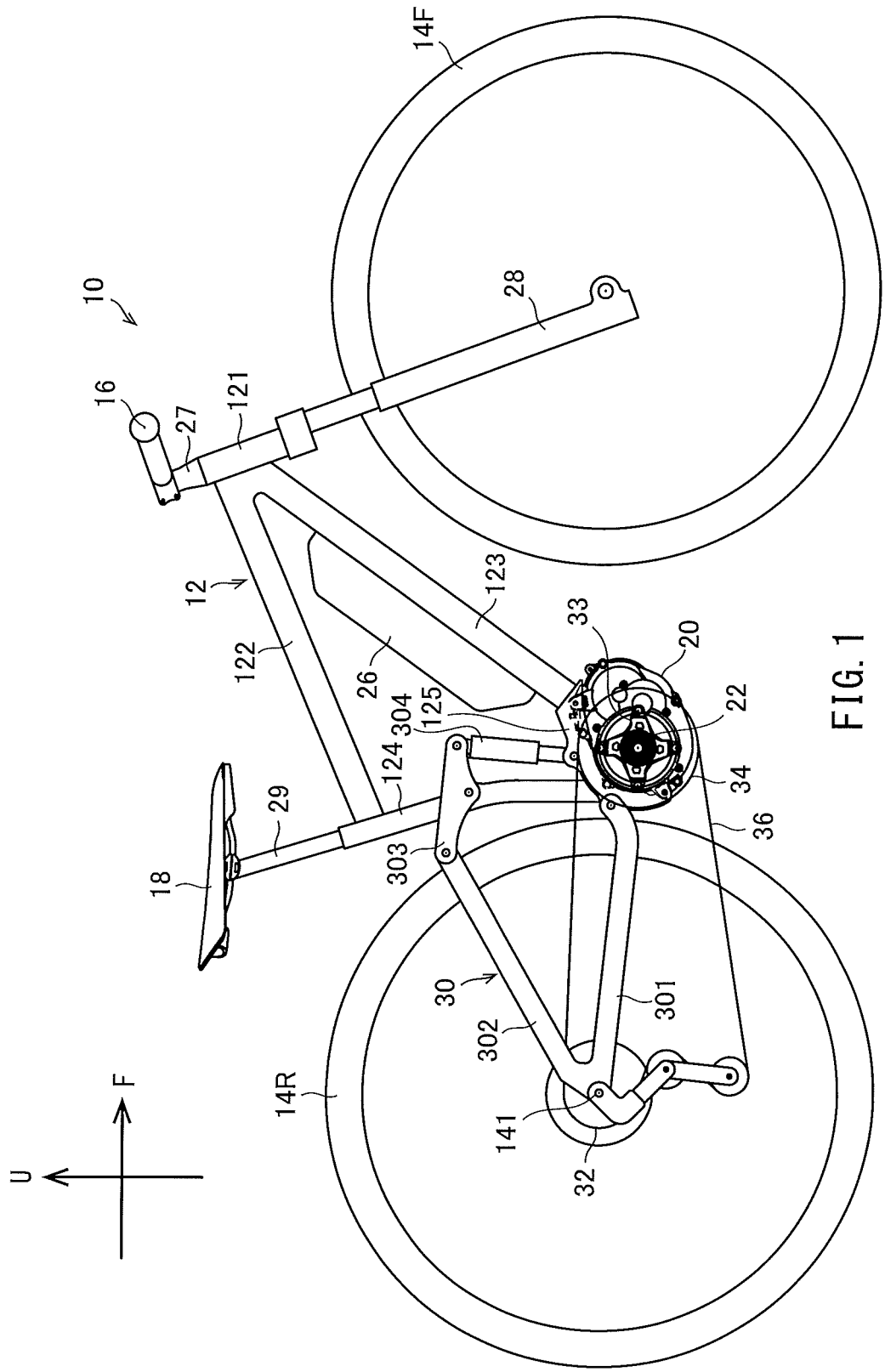
FIG. 1 is a right-side view of an electric-motor-assisted bicycle according to a preferred embodiment of the present invention.

The present inventors researched and developed a way to significantly reduce or minimize an increase of the rear/center length in an electric-motor-assisted bicycle including a drive unit attached to the vehicle-body frame. The inventors focused on and researched a structure with which the drive unit is attached to the vehicle-body frame.

The present inventors investigated the structure with which the drive unit is attached to the vehicle-body frame. The inventors discovered that the rear/center length increases if the drive unit is attached to the vehicle-body frame by three attachment portions, as described in JP 2014-196080 A. This discovery will be explained in detail below.

The three attachment portions are located on the outer surface of the housing of the drive unit. A first attachment portion is located forwardmost out of the three attachment portions as viewed from a side of the vehicle. The other two attachment portions (for example, second and third attachment portions) are located rearward of the first attachment portion as viewed from a side of the vehicle. The second and third attachment portions are generally at a same position in a front/rear direction of the vehicle, and are spaced apart from each other in a top/bottom direction of the vehicle. For example, the second attachment portion is located higher than the third attachment portion.

The drive unit is attached to a bracket located on the bottom of the vehicle-body frame. The bracket is connected to a down tube which is connected to a head tube, a seat tube into which a seat post extends that supports the saddle, and chain stays that support the axle of the rear wheel. Thus, the three attachment portions of the drive unit need to be attached to regions of the bracket that are different from those regions to which the tubes and stays are connected.

In an attempt to reduce the rear/center length, the present inventors focused on and researched a relationship between the regions in the bracket to which the chain stays are connected, and the regions in the bracket to which the second attachment portion is attached. The inventors discovered that the rear/center length increases when the region of the bracket to which a chain stay is attached and the associated region of the bracket to which the second attachment portion is attached are on a line segment connecting the shaft center of the axle of the rear wheel to the shaft center of the crank axle as viewed from a side of the vehicle. For example, the present inventors discovered that the chain stays are shifted rearward because of the wall thickness (for example, thickness in the radial direction) of a boss of the second attachment portion. If the rear/center length is not changed and the regions in the bracket to which the chain stays are attached are shifted rearward, the bracket may contact the rear wheel. Accordingly, the present inventors considered how to arrange the regions in the bracket to which the chain stays are attached.

For example, the present inventors considered lowering the drive unit such that the regions in the bracket to which the chain stays are attached are generally directly above the regions in the bracket to which the second attachment portion is attached as viewed from a side of the vehicle. However, the inventors discovered that this arrangement would make it difficult to provide a sufficient height or clearance between the drive unit and a ground surface (for example, minimum ground clearance).

The present inventors also considered an arrangement where the regions in the bracket to which the chain stays are attached are generally directly below the regions in the bracket to which the second attachment portion is attached as viewed from a side of the vehicle. However, the inventors discovered that the positional relationship between these regions and the regions in the bracket to which the third attachment portion is attached must be considered.

Based on the above discoveries, the present inventors further researched and concluded that, in order to significantly reduce or minimize the increase of the rear/center length, not only do the regions in the bracket to which the chain stays are attached need to be adjusted, but also the regions in the bracket to which the drive unit is attached need to be adjusted. The inventors discovered that the regions in the bracket to which the chain stays are attached and the regions in the bracket to which the drive unit is attached (for example, the regions located rearward of the crank axle) may be suitably adjusted relative to the line segment connecting the shaft center of the axle of the rear wheel to the shaft center of the crank axle. Consequently, preferred embodiments of the present invention were developed based on these discoveries.

Preferred embodiments of the present invention will be described below with reference to the drawings. The same or corresponding elements or features are labeled with the same characters in the drawings and their description will not be repeated.

Referring to FIG. 1, an electric-motor-assisted bicycle 10 according to a preferred embodiment of the present invention will be described. FIG. 1 is a schematic right-side view of the electric-motor-assisted bicycle 10.

In the following description, the directions "front/forward", "rear/rearward", "left", "right", "top/upward" and "bottom/downward" mean directions as perceived by a rider sitting on a saddle 18 of the electric-motor-assisted bicycle 10. In the drawings referred to in the following description, arrow "F" indicates a forward direction of the vehicle; arrow "U" indicates an upward direction of the vehicle; arrow "L" indicates a left direction of the vehicle; and arrow "R" indicates a right direction of the vehicle.

The electric-motor-assisted bicycle 10 includes a vehicle-body frame 12, a front wheel 14F, a rear wheel 14R, handlebars 16, the saddle 18, a drive unit 20, and a battery 26.

The vehicle-body frame 12 includes a head tube 121, a top tube 122, a down tube 123, a seat tube 124 and a bracket 125.

The head tube 121 is located at a front of the vehicle-body frame 12 and extends in a top/bottom direction. A stem 27 extends into the head tube 121 such that the stem is rotatable. The handlebars 16 are fixed to a top end of the stem 27. A front fork 28 is fixed to a bottom end of the stem 27. The front wheel 14F is rotatably attached to a bottom end of the front fork 28. For example, the front wheel 14F is supported by the vehicle-body frame 12 with the stem 27 and the front fork 28 located in between.

The top tube 122 is located rearward of the head tube 121 and extends in a front/rear direction. A front end of the top tube 122 is connected to the head tube 121. A rear end of the top tube 122 is connected to the seat tube 124.

The down tube 123 is located rearward of the head tube 121 and extends in the front/rear direction. The down tube 123 is located below the top tube 122. A front end of the down tube 123 is connected to the head tube 121. In a preferred embodiment, the front end of the down tube 123 is also connected to the front end of the top tube 122, for example. A rear end of the down tube 123 is connected to the bracket 125.

The battery 26 is attached to the down tube 123. The battery 26 supplies the drive unit 20 with electric power. The battery 26 includes a chargeable/dischargeable battery and a controller. The controller controls charging or discharging of the battery, and monitors battery output current, remaining battery level, and other parameters.

The seat tube 124 is located rearward of the top tube 122 and the down tube 123 and extends in the top/bottom direction. A bottom end of the seat tube 124 is connected to the bracket 125. For example, the seat tube 124 extends upwardly from the bracket 125.

The seat tube 124 is bent or curved at a center in the top/bottom direction. As such, a lower portion of the seat tube 124 extends in the top/bottom direction and an the upper portion of the seat tube 124 extends in a direction angled relative to the top/bottom direction.

A seat post 29 extends into the seat tube 124. The saddle 18 is attached to a top end of the seat post 29.

The bracket 125 is located at a bottom of the vehicle-body frame 12. The bracket 125 supports the drive unit 20. The drive unit 20 generates driving forces to be transmitted to the rear wheel 14R which is located rearward of the front wheel 14F. The bracket 125 and the drive unit 20 will be described in detail below.

The vehicle-body frame 12 further includes a swing arm 30, a pair of connecting arms 303 and a suspension 304. The swing arm 30 includes a pair of chain stays 301 and a pair of seat stays 302.

The chain stays 301 are arranged in the left/right direction and extend in the front/rear direction. The rear wheel 14R is located between the chain stays 301. The chain stays 301 are mirror images of each other. Accordingly, only the right chain stay 301 is shown in FIG. 1.

A front end of each of the chain stays 301 is attached to the bracket 125. For example, the chain stays 301 extend rearwardly from the bracket 125. The chain stays 301 swing or pivot relative to the bracket 125 about an axis that extends in the left/right direction.

An axle 141 of the rear wheel 14R is attached to the rear ends of the chain stays 301 such that the axle 141 cannot rotate. For example, the rear wheel 14R is supported on the chain stays 301 such that the rear wheel rotates about the axle 141. Thus, the rear wheel 14R is supported by the vehicle-body frame 12. A multi-stage driven sprocket 32 is fixed to the rear wheel 14R.

The seat stays 302 are arranged in the left/right direction and extend in the front/rear direction. The rear wheel 14R is located between the seat stays 302. The seat stays 302 are mirror images of each other. Accordingly, only the right seat stay 302 is shown in FIG. 1.

A rear end of the left seat stay 302 is connected to a rear end of the left chain stay 301. A rear end of the right seat stay 302 is connected to a rear end of the right chain stay 301.

The connecting arms 303 are arranged in the left/right direction and extend in the front/rear direction. The seat tube 124 is located between the connecting arms 303. The connecting arms 303 are mirror images of each other. Accordingly, only the right connecting arm 303 is shown in FIG. 1.

The connecting arms 303 are attached to the seat tube 124. The connecting arms 303 swing or pivot relative to the seat tube 124 about an axis that extends in the left/right direction.

As viewed from a side of the vehicle, front ends of the connecting arms 303 are located forward of the seat tube 124. As viewed from a side of the vehicle, rear ends of the connecting arms 303 are located rearward of the seat tube 124.

The rear end of the left connecting arm 303 is attached to a front end of the left seat stay 302. The left connecting arm 303 swings or pivots relative to the left seat stay 302 about an axis that extends in the left/right direction.

The rear end of the right connecting arm 303 is attached to a front end of the right seat stay 302. The right connecting arm 303 swings or pivots relative to the right seat stay 302 about an axis that extends in the left/right direction.

The suspension 304 is located forward of the seat tube 124 and rearward of the down tube 123. A top end of the suspension 304 is attached to the connecting arms 303. The suspension 304 swings or pivots relative to the connecting arms 303 about an axis that extends in the left/right direction. A bottom end of the suspension 304 is attached to the bracket 125. The suspension 304 swings or pivots relative to the bracket 125 about an axis that extends in the left/right direction. The suspension 304 is attached to the bracket 125 at a position that is forward of a position at which the seat tube 124 is attached to the bracket 125.

A driving sprocket 34 is attached to the drive unit 20 with a support 33 located in between. A chain 36 is wound about the driving sprocket 34 and driven sprocket 32.

A crank arm is attached to each end of a crank axle 22 included in the drive unit 20, in the axial direction. A pedal is attached to each of the crank arms.

Figure 2:
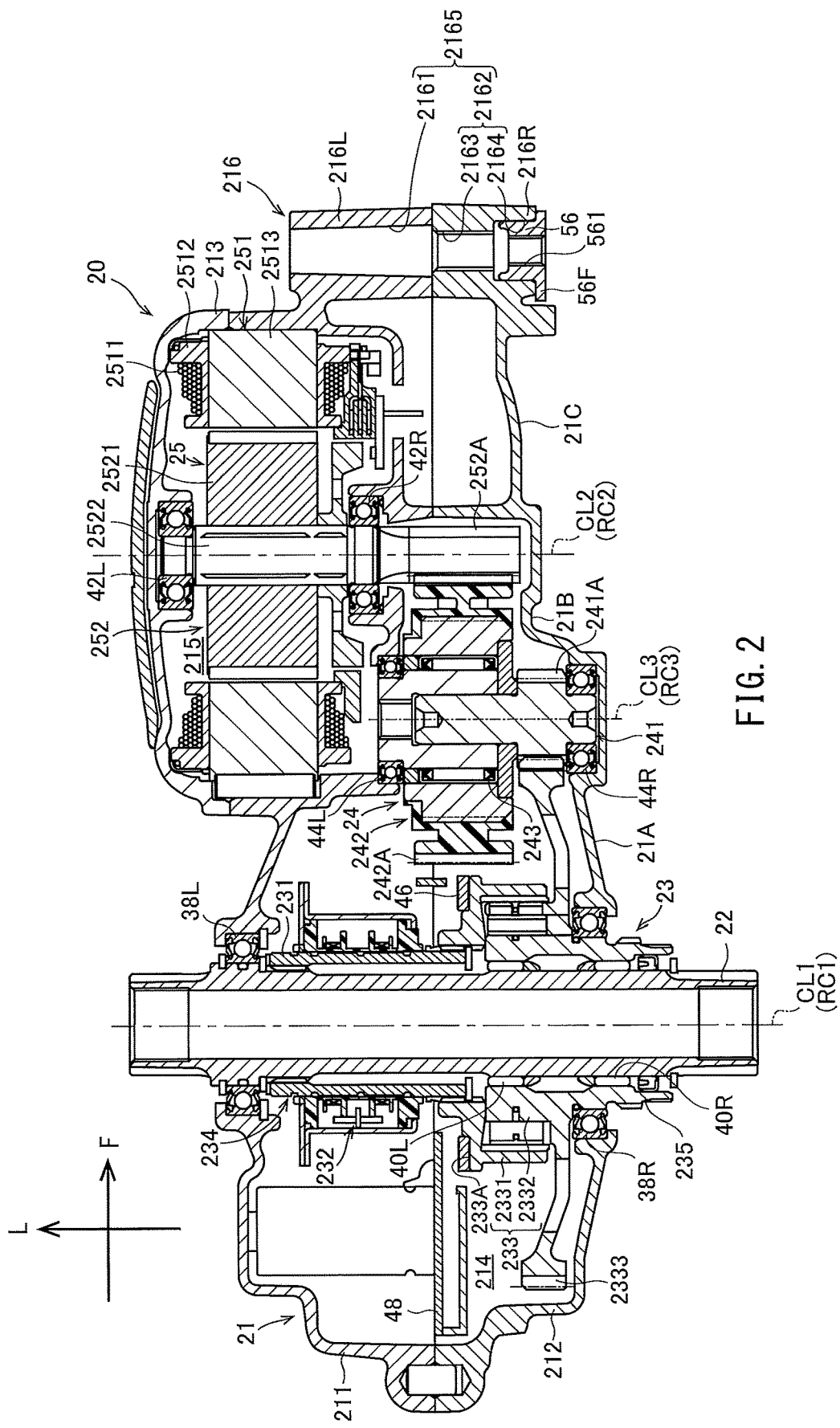
FIG. 2 is a vertical cross-sectional view of an internal structure of a drive unit included in the electric-motor-assisted bicycle shown in FIG. 1.

The drive unit 20 will be described with reference to FIG. 2. FIG. 2 is a vertical cross-sectional view of an internal structure of the drive unit 20.

The drive unit 20 includes a housing 21, the crank axle 22, a rotating shaft 23, a reduction gear 24 and a motor 25. These components will be described below.

The housing 21 is fixed to the bracket 125 by a plurality of fasteners. The housing 21 includes a left housing 211, a right housing 212 and a cover 213. The left housing 211, the right housing 212 and the cover 213 are made of a metal material, for example. The metal material preferably includes an aluminum alloy, for example.

The left housing 211 is laid over the right housing 212 from the left in the left/right direction. The left housing 211 is fixed to the right housing 212 by a plurality of fasteners. A space 214 is defined by the left housing 211 and the right housing 212.

The cover 213 is laid over the left housing 211 from the left in the left/right direction. The cover 213 is fixed to the left housing 211 by a plurality of fasteners. A space 215 is defined by the cover 213 outside the left housing 211 (for example, to the left thereof).

The crank axle 22 extends through the housing 21 in the left/right direction. For example, a central axis CL1 of the crank axle 22 extends in the left/right direction. The central axis CL1 is a rotational center RC1 of the crank axle 22 as viewed in an axial direction of the crank axle 22.

A bore extends through the crank axle 22 in the axial direction of the crank axle 22. The crank axle 22 preferably has a cylindrical or a substantially cylindrical shape, for example.

The crank axle 22 is supported on the housing 21 such that the crank axle rotates relative to the housing about the central axis CL1 of the crank axle 22. A bearing 38L which rotatably supports the crank axle 22 is fixed to the left housing 211. A bearing 38R, which rotatably supports the crank axle 22 with a driven member 2332 of a one-way clutch 233 described below and slide bearings 40L and 40R located in between, is fixed to the right housing 212.

The crank axle 22 extends through the rotating shaft 23. The rotating shaft 23 is housed in the housing 21. The rotating shaft 23 will be described in detail below.

Figure 3:
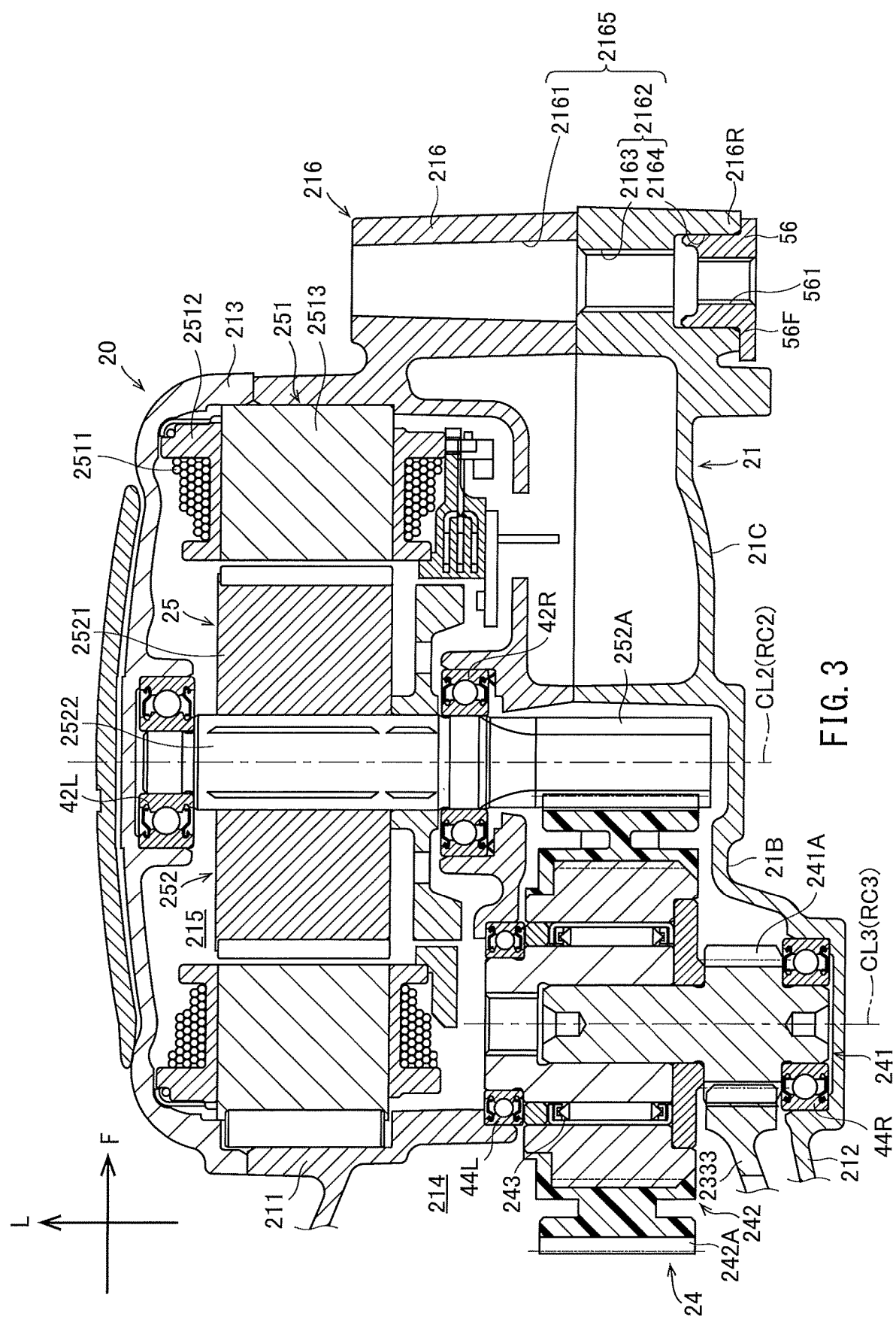
FIG. 3 is an enlarged vertical cross-sectional view of a portion of FIG. 2.

The motor 25 and the reduction gear 24 will be described with reference to FIG. 3. FIG. 3 is an enlarged cross-sectional view of a portion of FIG. 2.

The motor 25 is housed in the housing 21. The motor 25 generates driving forces that assist the rider in propelling the electric-motor-assisted bicycle 10. The motor 25 includes a stator 251 and a rotor 252.

The stator 251 includes a plurality of bobbins 2512 (a preferred embodiment preferably includes 14 bobbins, for example) around which coils 2511 are wound. An iron core 2513 extends into the bobbins 2512. The stator 251 is located within the space 215. The stator 251 is fixed to the left housing 211.

The rotor 252 is located inside the stator 251. A central axis CL2 of the rotor 252 is parallel or substantially parallel to the central axis CL1 of the crank axle 22. For example, the rotor 252 is parallel or substantially parallel to the crank axle 22. The central axis CL2 is a rotational center RC2 of the rotor 252 as viewed in an axial direction of the crank axle 22.

The rotor 252 includes a rotor body 2521 and an output shaft 2522. These components will be described below.

An outer periphery of the rotor body 2521 is magnetized to form N- and S-poles arranged alternately in a circumferential direction. In a preferred embodiment, seven N-poles and seven S-poles, for example, are included.

The output shaft 2522 extends through the rotor body 2521. The output shaft 2522 is fixed to the rotor body 2521. For example, the output shaft 2522 rotates together with the rotor body 2521.

The output shaft 2522 is supported by two bearings 42L and 42R such that the output shaft 2522 rotates relative to the housing 21 about the central axis CL2. The bearing 42L is fixed to the cover 213. The bearing 42R is fixed to the left housing 211 and located to the right of the rotor body 2521 (for example, farther in a second axial direction).

The output shaft 2522 extends through the left housing 211. An output gear 252A is located on portions of the output shaft 2522 that are located within the space 214.

The reduction gear 24 is housed in the housing 21. For example, the reduction gear 24 is located within the space 214. The reduction gear 24 overlaps portions of the motor 25 as viewed in an axial direction of the crank axle 22.

A central axis CL3 of the reduction gear 24 (for example, central axis CL3 of a rotational shaft 241) is parallel or substantially parallel to the central axis CL1 of the crank axle 22. For example, the reduction gear 24 is parallel or substantially parallel to the crank axle 22. The central axis CL3 is a rotational center RC3 of the reduction gear 24 as viewed in an axial direction of the crank axle 22. The rotational center RC3 overlaps the stator 251 as viewed in an axial direction of the crank axle 22.

The reduction gear 24 includes the rotatable shaft 241 and a cylindrical portion 242. These components will be described below.

The cylindrical portion 242 preferably has a cylindrical or a substantially cylindrical shape. The cylindrical portion 242 includes a gear 242A that engages the output gear 252A. The gear 242A preferably has a larger diameter than the output gear 252A and includes more teeth than the output gear 252A. For example, a rotational speed of the gear 242A is lower than a rotational speed of the output gear 252A.

The rotatable shaft 241 extends into the cylindrical portion 242. The rotatable shaft 241 is coaxial with the cylindrical portion 242. The rotatable shaft 241 includes a small-diameter shaft portion, which includes a gear 241A, that is press-fitted into a large-diameter shaft portion. The gear 241A and the gear 242A are at different locations along the rotatable shaft 241 (in the axial direction of the rotatable shaft 241). The gear 241A is located closer to the right housing 212 than the gear 242A in the left/right direction.

A one-way clutch 243 is located between the rotatable shaft 241 and the cylindrical portion 242. Thus, when the rotor 252 rotates in a positive direction, the rotatable shaft 241 rotates together with the cylindrical portion 242. For example, driving forces from the motor 25 are transmitted to a gear 2333 via the reduction gear 24. When the motor 24 is stationary and the gear 2333 rotates in the forward direction (for example, in a direction of advancement of the vehicle), the rotatable shaft 241 rotates relative to the cylindrical portion 242. For example, rotation of the gear 2333 is not transmitted to the rotor 252.

The rotatable shaft 241 is supported by two bearings 44L and 44R such that the rotatable shaft 241 rotates relative to the housing 21 about the central axis CL3. The bearing 44L is lightly press-fitted into the left housing 211. The bearing 44R is fixed to the right housing 212.

Figure 4:
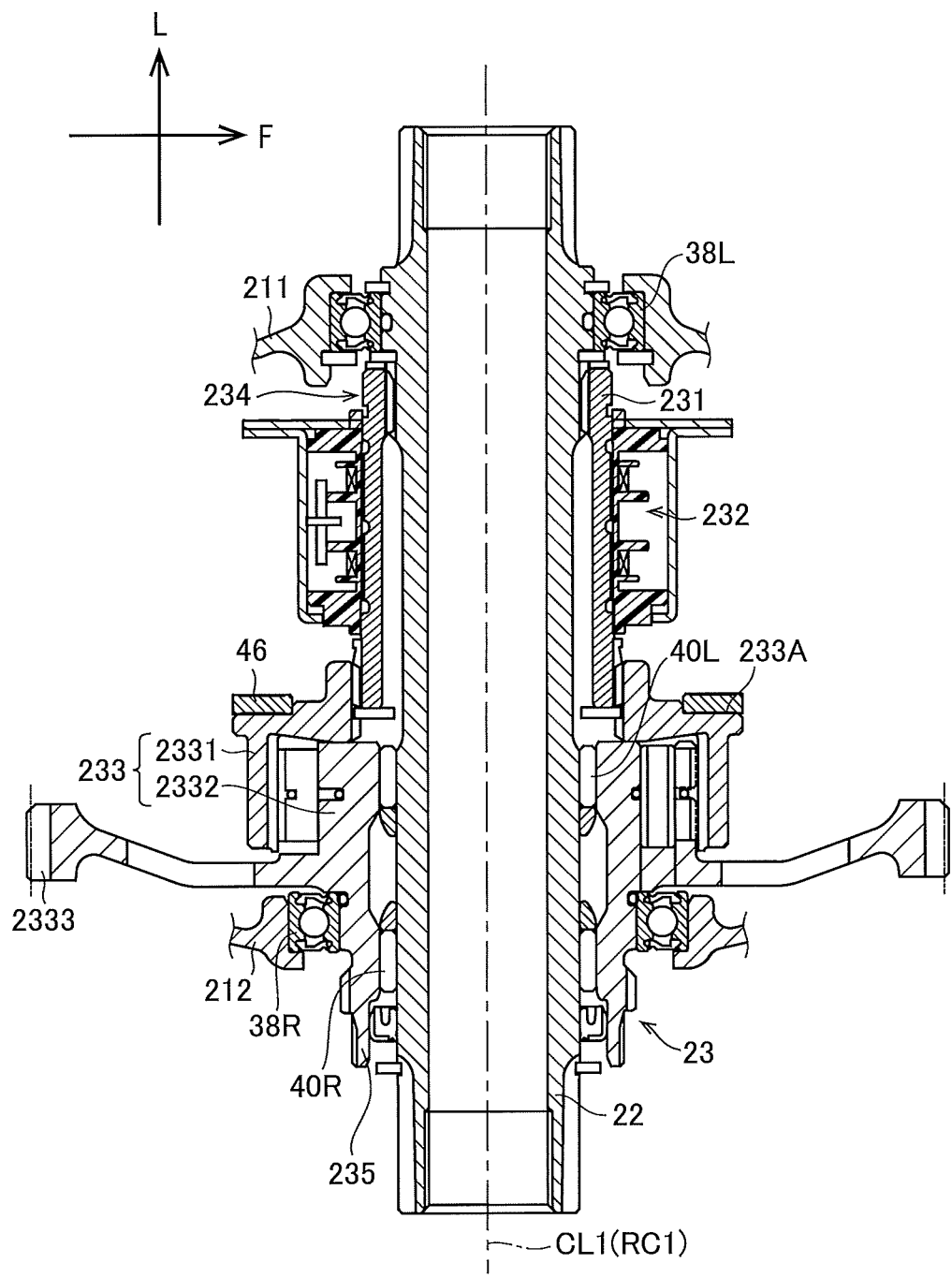
FIG. 4 is an enlarged vertical cross-sectional view of another portion of FIG. 2.

The rotatable shaft 23 will be described with reference to FIG. 4. FIG. 4 is an enlarged vertical cross-sectional view of another portion of FIG. 2.

The rotatable shaft 23 is coaxial with the crank axle 22 and rotates together with the crank axle 22. The crank axle 23 includes a coupling shaft 231 and a one-way clutch 233.

The coupling shaft 231 preferably has a cylindrical or a substantially cylindrical shape. The crank axle 22 extends into the coupling shaft 231. The coupling shaft 231 is coaxial with the crank axle 22.

A left end of the coupling shaft 231 (for example, furthermost position thereon in a first axial direction) is coupled with the crank axle 22 by spline coupling or the like, for example. As such, the coupling shaft 231 rotates together with the crank axle 22 regardless of whether the crank axle 22 rotates in the forward or rearward direction.

A torque detector 232 is located around the coupling shaft 231. The torque detector 232 is supported on the left housing 211.

The torque detector 232 detects torque generated in the coupling shaft 231 when the rider pedals. The torque detector 232 preferably is a known magnetostrictive torque sensor. The torque detector 232 transmits a signal associated with the detected torque to a controller mounted on a substrate 48. The controller receives the signal and determines a pedaling state of the bicycle, which is based on pedaling by the rider, and controls the motor 25.

The one-way clutch 233 is located closer to the right housing 212 than the torque detector 232 is in the axial direction of the crank axle 22. The one-way clutch 233 is coaxial with the crank axle 22.

The one-way clutch 233 includes a driving member 2331 and a driven member 2332.

The driving member 2331 preferably has a cylindrical or a substantially cylindrical shape. The right end of the coupling shaft 231 (for example, furthermost position thereon in the second axial direction) extends into the left end of the driving member 2331 (for example, furthermost position thereon in the first axial direction). The driving member 2331 is coaxial with the coupling shaft 231. The right end of the coupling shaft 231 (for example, furthermost position thereon in the second axial direction) is coupled with the left end of the driving member 2331 (for example, furthermost position thereon in the first axial direction) by spline coupling or the like. Accordingly, the driving member 2331 rotates together with the coupling shaft 231 regardless of whether the coupling shaft 231 rotates in the forward or rearward direction. For example, the driving member 2331 rotates together with the crank axle 22 regardless of whether the crank axle 22 rotates in the forward or rearward direction. The coupling shaft 231 and driving member 2331 function or operate as a crank-rotation input shaft 234 that rotates in an integral manner with the crank axle 22.

The outer periphery of the driving member 2331 includes an annular attachment surface 233A. The attachment surface 233A expands radially with respect to the driving member 2331 and extends in a circumferential direction. A ring magnet 46 is fixed to the attachment surface 233A. For example, the ring magnet 46 rotates together with the driving member 2331. A detector mounted on the substrate 48 located within the housing 21 detects changes in magnetic field caused by rotation of the ring magnet 46 and, thus, detects rotation of the driving member 2331 (for example, crank axle 22).

The driven member 2332 preferably has a cylindrical or a substantially cylindrical shape. The crank axle 22 extends into the driven member 2332. Slide bearings 40L and 40R are located between the driven member 2332 and the crank axle 22. Thus, the driven member 2322 is coaxial with the crank axle 22 and rotates relative to it.

The driven member 2332 extends into a right end of the driving member 2331 (for example, furthermost position thereon in the second axial direction). A ratchet working as a one-way clutch mechanism is located between the driven member 2332 and the right end of the driving member 2331 (for example, furthermost position thereon in the second axial direction). Thus, rotational forces in the forward direction from the driving member 2331 are transmitted to the driven member 2332, while rotational forces in the rearward direction from the driving member 2331 are not transmitted to the driven member 2332.

The driven member 2332 is supported by the bearing 38R fixed to the right housing 212 such that the driven member rotates relative to the housing 21 about the central axis CL1 of the crank axle 22.

The driven member 2332 extends through the right housing 212. The driving sprocket 34 (FIG. 1) is attached, by the support 33 (FIGS. 1 and 8, for example), to portions of the driven member 2332 that are located outward (for example, to the right) of the housing 21.

The driven member 2332 includes a gear 2333. The gear 2333 engages the gear 241 of the reduction gear 24. The gear 2333 preferably has a larger diameter than the gear 241A and preferably has more teeth than the gear 241A. For example, a rotational speed of the gear 2333 is lower than a rotational speed of the gear 241A.

The driven member 2332 includes a resultant-force output shaft 235 that provides a resultant of a human-generated force supplied through the one-way clutch 233 (for example, pedaling force) and a motor-generated driving force supplied through the gear 2333. For example, the resultant-force output shaft 235 is included in the rotatable shaft 23.

Figure 5:
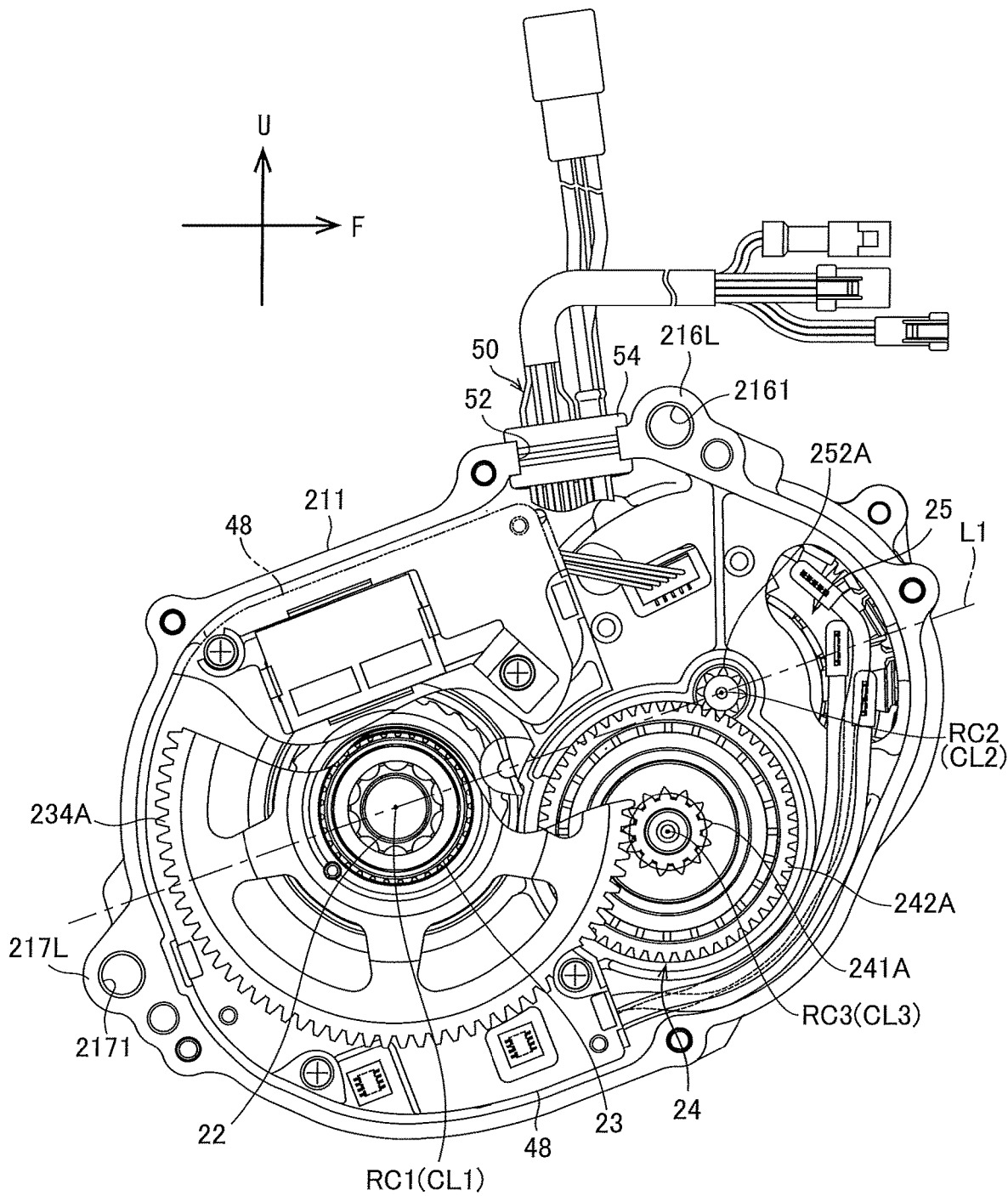
FIG. 5 is a right-side view of the internal structure of the drive unit with a right housing removed.

The relationship between the rotational center RC1 of the crank axle 22, the rotational center RC2 of the rotor 252 and the rotational center RC3 of the reduction gear 24 will be described with reference to FIG. 5. FIG. 5 is a right-side view of the internal structure of the drive unit 20 with the right housing 212 removed.

The rotational center RC3 is located forward of the rotational center RC1 in the front/rear direction of the vehicle. The rotational center RC2 is located forward of the rotational center RC3 in the front/rear direction of the vehicle. For example, the rotational center RC2 is located forward of the rotational center RC1 in the front/rear direction of the vehicle. Thus, the motor 25 is located forward of the crank axle 22 in the front/rear direction of the vehicle.

The rotational center RC3 is generally located lower than a straight line L1 connecting the rotational center RC1 to the rotational center RC2 as seen from a side of the vehicle.

Further, as shown in FIG. 5, the substrate 48 is located within the housing 21. The substrate 48 controls power supply to the motor 25. The substrate 48 surrounds the crank axle 22 as viewed in an axial direction of the crank axle 22. In a preferred embodiment of the present invention, as shown in FIG. 5, the substrate 48 generally has the shape of a "C" as viewed in an axial direction of the crank axle 22, for example.

An outlet 52 is disposed in the housing 21 to allow cables 50 connected to the substrate 48 to be routed out of the housing 21. In a preferred embodiment of the present invention, a grommet 54 is located on the outlet 52. The grommet 54 preferably includes an elastic body, for example. The grommet 54 protects the cables 50 and prevents dust and water from entering. The cables 50 are routed out of the drive unit 20 through the grommet 54. The cables 50 are connected to the battery 26 (FIG. 1).

Figure 6:
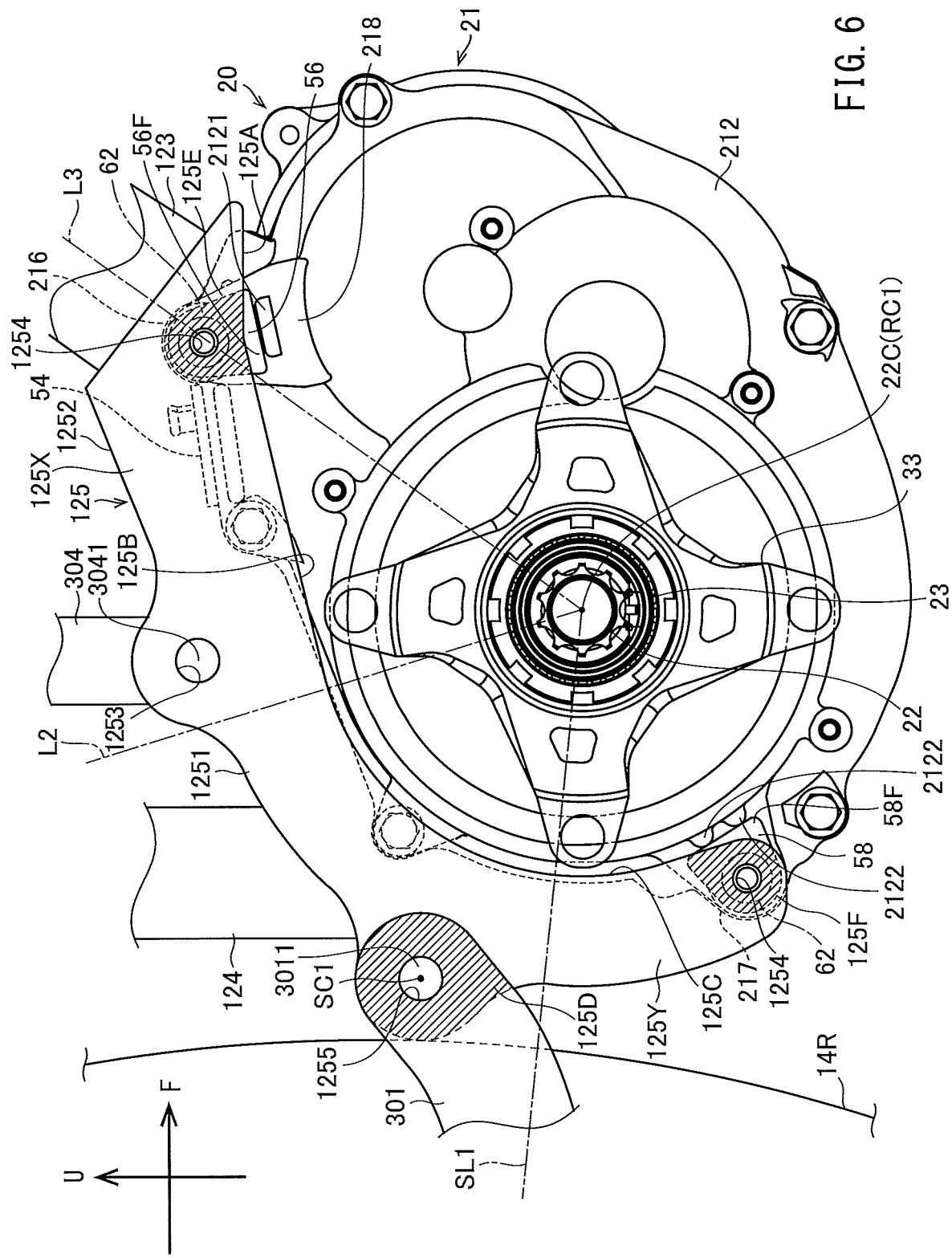
FIG. 6 is an enlarged right-side view of the drive unit attached to a bracket.

A structure that attaches the drive unit 20 to the bracket 125 will be described with reference to FIG. 6. FIG. 6 is an enlarged right-side view of the drive unit 20 attached to the bracket 125.

The bracket 125 includes a pair of side plates 1251 arranged to the left and right. The side plates 1251 extend in the front/rear direction and top/bottom direction. The side plates 1251 are arranged in the left/right direction. The side plates 1251 are mirror images of each other. Accordingly, FIG. 6 only shows the right side plate 1251.

Figure 7:
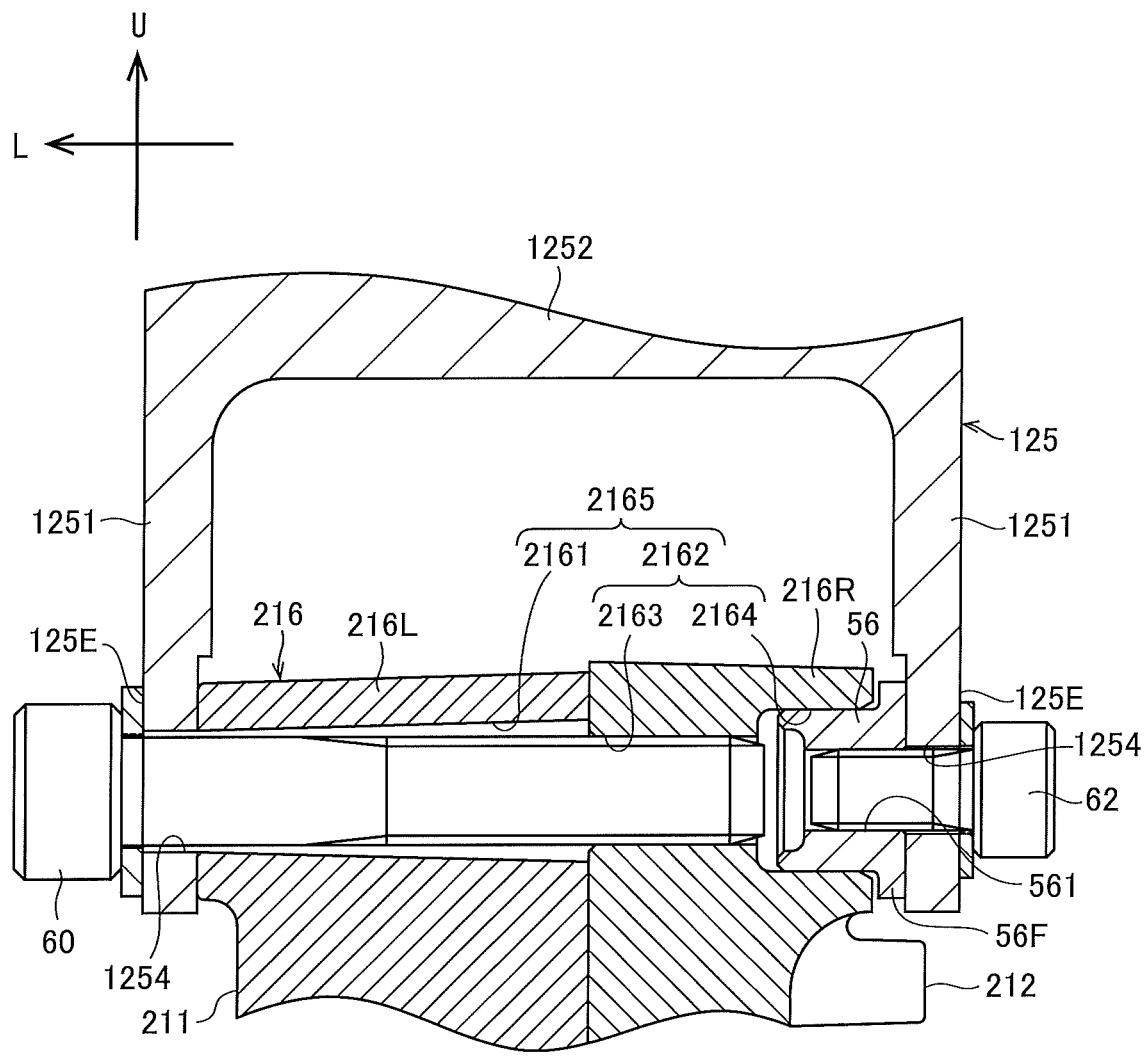
FIG. 7 is a cross-sectional view of a structure that attaches the drive unit to the bracket.

As shown in FIG. 7, the bracket 125 further includes a top plate 1252. The top plate 1252 connects the side plates 1251. The left side plate 1251 extends downwardly from the left edge of the top plate 1252. The right side plate 1251 extends downwardly from the right edge of the top plate 1252. The bottom end of the seat tube 124 and the bottom end of the down tube 123 are connected to the top plate 1252.

Returning to FIG. 6, the side plates 1251 generally extend in the front/rear direction. Each side plate 1251 includes an edge 125A, an edge 125B and an edge 125C.

The edge 125A extends in the front/rear direction. The edge 125B extends forwardly and upwardly. For example, a front end of the edge 125B is located higher than a rear end of the edge 125B. The front end of the edge 125B is connected to a rear end of the edge 125A. The edge 125C extends rearwardly and downwardly from the rear end of the edge 125B to define an arc. The edge 125C defines an arc with a constant or substantially constant distance from the rotational center RC1. A rear end of the edge 125C is located rearward and downward of a front end of the edge 125C. The front end of the edge 125C is connected to the rear end of the edge 125B.

A portion of each side plate 1251 that includes the edges 125A and 125B generally extends forwardly and upwardly. This portion will be hereinafter referred to as first portion 125X.

A hole 1253 is disposed in a rear portion of the first portion 125X. The hole 1253 extends through the first portion 125X in the left/right direction (or thickness direction). The hole 1253 is located above the edge 125B. A shaft 3041 located on the bottom portion of the suspension 304 extends into the hole 1253. Thus, the suspension 304 is swingably or pivotably attached to the first portion 125X.

A portion of each side plate 1251 that includes the edge 125C generally extends rearwardly and downwardly from the rear end of the first portion 125X to define an arc. This portion will be hereinafter referred to as second portion 125Y. A front end of the second portion 125Y is connected to a rear end of the first portion 125X. The front end of the second portion 125Y is located higher than the rear end of the second portion 125Y.

The second portion 125Y includes a region 125D to which the front end of the associated chain stay 301 is to be attached. For ease of understanding, the region 125D is hatched in FIG. 6. The region 125D is similarly hatched in other drawings referred to for describing the region 125D.

The region 125D is a portion of the second portion 125Y that overlaps the associated chain stay 301 as viewed from a side of the vehicle. The region 125D is located at the center of the extension of the second portion 125Y. The region 125D is located rearward of the edge 125C.

A hole 1255 is disposed in the region 125D. For example, the region 125D includes a hole 125. A shaft 3011 located on the front end of the chain stay 301 extends into the hole 1255. Thus, the chain stay 301 is swingably and pivotably attached to the bracket 125 (for example, associated side plate 1251).

Figure 8:
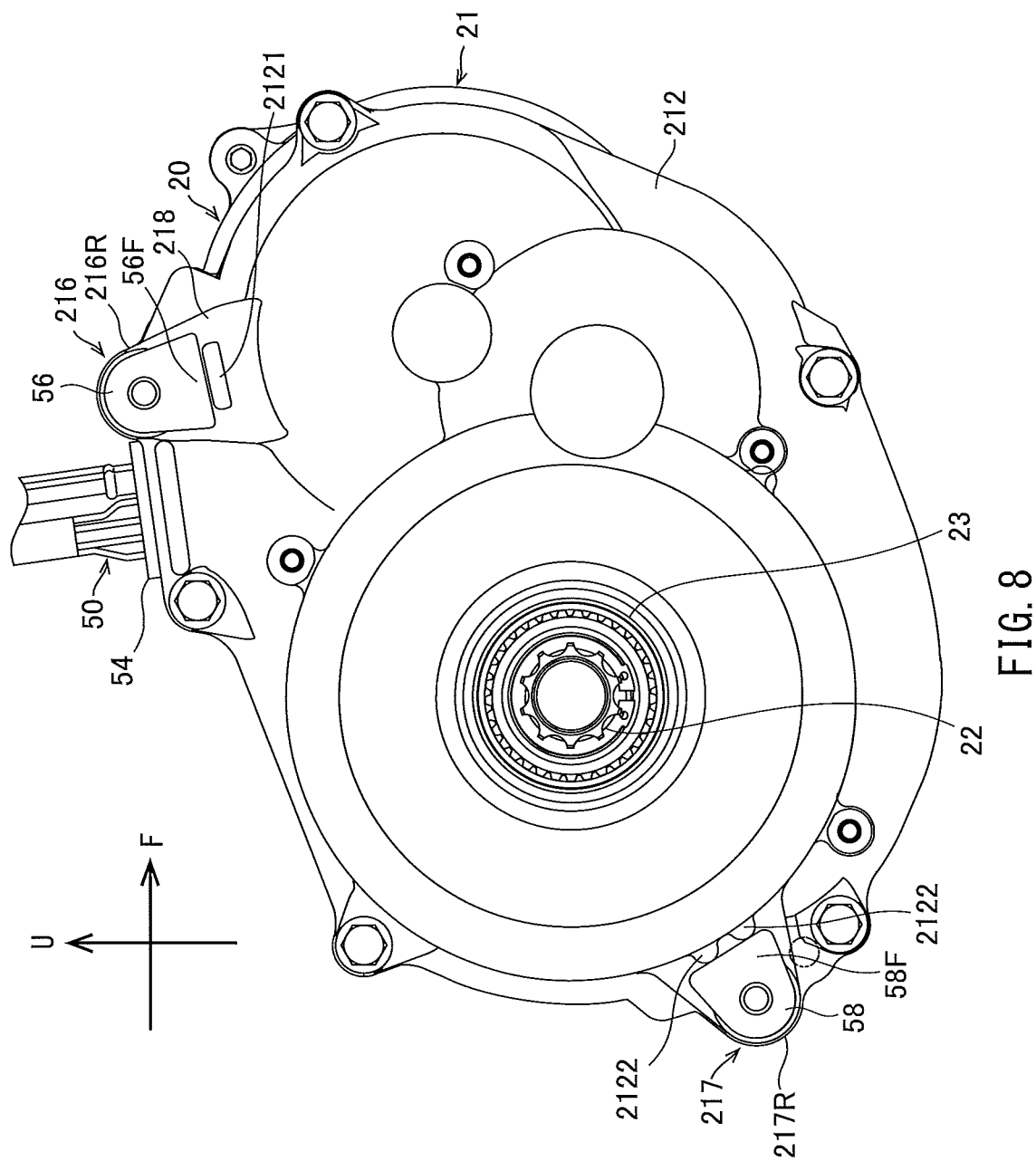
FIG. 8 is a right-side view of the drive unit.

Two attachment portions 216 and 217 (examples of "a first coupler" and "a second coupler") included in the drive unit 20 will be described with reference to FIG. 8. FIG. 8 is a right-side view of the drive unit 20.

The attachment portion 216 is located on the housing 21. The attachment portion 216 protrudes upward from the outer surface of the housing 21. The attachment portion 216 is located higher than the crank axle 22. The attachment portion 216 is located forward of the grommet 54.

As shown in FIG. 2, the attachment portion 216 includes bosses 216L and 216R. The attachment portion 216 will be described in detail below with reference to FIG. 2.

The boss 216L is located on the left housing 211. The boss 216L protrudes from the outer surface of the left housing 211.

A bore 2161 is disposed in the boss 216L. The bore 2161 extends through the boss 216L in the left/right direction.

The boss 216R is located on the right housing 212. The boss 216R protrudes from the outer surface of the right housing 212.

A bore 2162 is disposed in the boss 216R. The bore 2162 extends through the boss 216R in the left/right direction.

The bore 2162 includes a small-diameter portion 2163 and a large-diameter portion 2164. These portions will be described below.

The small-diameter portion 2163 is located closer to the bore 2161 than the large-diameter portion 2164 in the left/right direction. The inner periphery of the small-diameter portion 2163 is threaded. For example, the small-diameter portion 2163 of the bore 2162 defines and functions as a screw hole.

The large-diameter portion 2164 preferably has a larger diameter than the small-diameter portion 2163. The inner periphery of the large-diameter portion 2164 is not threaded. The large diameter portion 2164 of the bore 2162 defines and functions an insertion hole.

The bore 2161 will be described with reference to FIG. 5. The bore 2161 is generally located higher than the straight line L1. For example, the bore 2161 is located on the side of the straight line L1 that is opposite to that associated with the rotational center RC3. The bore 2161 is located forward of the substrate 48. The bore 2161 is located higher than the motor 25. The bore 2161 is located rearward of the rotational center RC2. The bore 2161 is located forward of the grommet 54. The bore 2161 is located generally at the same position as the rotational center RC3 in the front/rear direction. The bore 2161 is located forward of the rotational center RC1.

Returning to FIG. 2, when the left housing 211 is attached to the right housing 212, the bores 2161 and 2162 are coaxial. For example, a bore 2165 extending through the attachment portion 216 in the left/right direction includes the bores 2161 and 2162.

In FIG. 2, a fitting 56 is lightly press-fitted into the large-diameter portion 2164 of the bore 2162. The fitting 56 attaches the attachment portion 216 to the bracket 125. The fitting 56 as a whole preferably has a cylindrical or a substantially cylindrical shape. A deformed flange 56F is integral with the right end of the fitting 56 (in the axial direction). The deformed flange 56F preferably has different lengths in circumferentially different directions that are perpendicular or substantially perpendicular to the axial direction of the fitting 56. The deformed flange 56F contacts a protrusion 2121 located on the outer surface of the right housing 212 to define a rotation stop of the fitting 56 (FIGS. 6 and 8).

Returning to FIG. 8, the attachment portion 217 is located on the housing 21. The attachment portion 217 protrudes rearwardly and downwardly from the outer surface of the housing 21. The attachment portion 217 is located rearward of the crank axle 22. The attachment portion 217 is located lower than the crank axle 22. The attachment portion 217 is located rearward of the attachment portion 216. The attachment portion 217 is located lower than the attachment portion 216.

Similar to the attachment portion 216, the attachment portion 217 includes a boss 217L (FIG. 5) located on the left housing 211 and a boss 217R located on the right housing 212. As shown in FIG. 5, a bore 2171 is disposed in the boss 217L. Similar to the boss 216R, the boss 217R includes a bore including a small-diameter portion and a large-diameter portion.

When the left housing 211 is attached to the right housing 212, the bore 2171 in the boss 217L and the bore in the boss 217R are coaxial. For example, a bore extending through the attachment portion 217 in the left/right direction includes the bore 2171 in the boss 217L and the bore in the boss 217R.

As shown in FIG. 8, a fitting 58 is lightly press-fit into the large-diameter portion of the bore in the boss 217R. The fitting 58 attaches the attachment portion 217 to the bracket 125. Similar to the fitting 56, the fitting 58 as a whole preferably has a cylindrical or a substantially cylindrical shape. A deformed flange 58F is integral with the right end of the fitting 58 (in the axial direction) (FIGS. 6 and 8). The deformed flange 58F preferably has different lengths in circumferentially different directions that are perpendicular or substantially perpendicular to the axial direction of the fitting 58. The deformed flange 58F contacts protrusions 2122 located on the outer surface of the right housing 212 to define a rotation stop for the fitting 58 (FIGS. 6 and 8).

The bore 2171 will be described with reference to FIG. 5. The bore 2171 is generally located lower than the straight line L1. The bore 2171 is located rearward of the rotational center RC2. The bore 2171 is located lower than the rotational center RC2. The bore 2171 is located rearward of the substrate 48. The bore 2171 is located rearward of the rotational center RC1 and the rotational center RC3.

As shown in FIG. 6, the bracket 125 includes a region 125E to which the attachment portion 216 is to be attached and a region 125F to which the attachment portion 217 is to be attached. These regions 125E and 125F will be described below. For ease of explanation, the regions 125E and 125F are hatched in the drawings referred to in the following description.

The region 125E will be described. The region 125E is located in a front portion of the first portion 125X. The region 125E is a region of the first portion 125X that the attachment portion 216 overlaps as viewed from a side of the vehicle. In FIG. 6, the head of a bolt 62 that attaches the attachment portion 216 to the first portion 125X is indicated by phantom lines. The stem of the bolt 62 extends into a hole 1254 disposed in the region 125E. For example, the region 125E includes the hole 1254.

The region 125E is located forward of the hole 1253. The region 125E is located closer to the bottom end of the down tube 123 (for example, an end to be attached to the bracket 125) than the grommet 54.

The attachment portion 216 attached to the region 125E of the bracket 125 will be described with reference to FIG. 7. FIG. 7 is a cross-sectional view of a structure that attaches the attachment portion 216 to the bracket 125.

The bolt 60 extends into the bore 2165 in the attachment portion 216 from the left. The bolt 60 is also inserted into the hole 1254 disposed in the left side plate 1251. The external thread on the periphery of the bolt 60 engages the thread on the internal periphery of the bore 2162. As the bolt 60 is tightened, the boss 216L contacts the left side plate 1251.

A hole 561 is disposed in the fitting 56. The bolt 62 extends into the hole 561 from the right. The bolt 62 is also inserted into the hole 1254 disposed in the right sideplate 1251. The external thread on the periphery of the bolt 62 engages the thread on the internal periphery of the hole 561. As the bolt 62 is tightened, the fitting 56 that is lightly press-fitted into the large-diameter portion 2164 of the bore 2162 moves to the right (for example, in the direction in which the fitting 56 moves out of the large-diameter portion 2164 of the bore 2162) and contacts the right sideplate 1251.

The region 125F will be described. The region 125F is located in a rear portion of the second portion 125Y. The region 125F is a region of the second portion 125Y that the attachment portion 217 is to overlap as viewed from a side of the vehicle. In FIG. 6, the head of the bolt 62 that attaches the attachment portion 217 to the second portion 125Y is indicated by phantom lines. The stem of the bolt 62 extends into the hole 1254 disposed in the region 125F. For example, the region 125F includes the hole 1254.

The region 125F is located lower than the region 125D. For example, the region 125F is located lower than the center SC1 about which the associated chain stay 301 swings relative to the bracket 125. The region 125F is located forward of a swing center SC1.

The region 125F is located rearward of the position on the bracket 125 to which the seat tube 124 is attached in the direction in which the second portion 125Y extends. The region 125F is located lower than the bottom end of the seat tube 124 (for example, end to be attached to the bracket 125). In a preferred embodiment, as shown in FIG. 6, the region 125F is located directly below the bottom end of the seat tube 124.

The attachment portion 217 is attached to the region 125F of the bracket 125 in the same manner in which the attachment portion 216 is attached to the region 125E of the bracket 125, and thus no detailed description will be provided.

Figure 9:
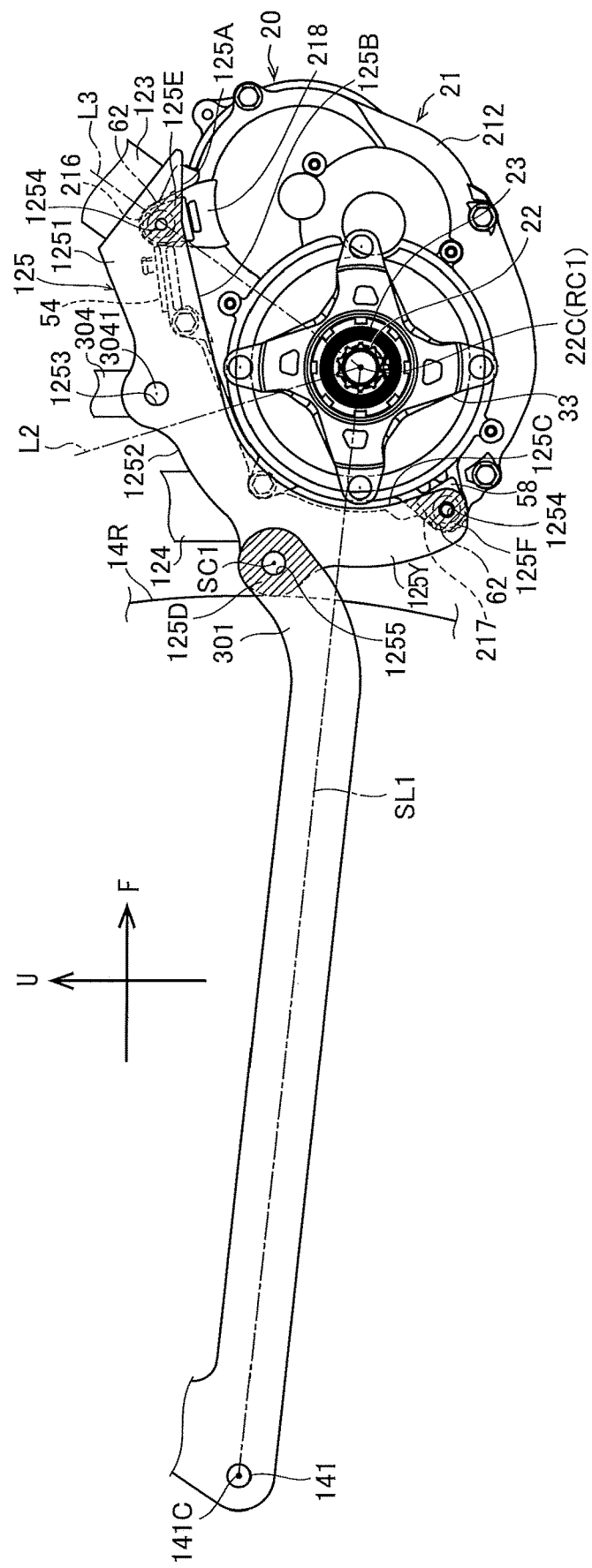
FIG. 9 is an enlarged right-side view of a portion of a vehicle-body frame with the bracket attached thereto.

The positional relationship between the regions 125E and 125F will be described with reference to FIG. 9. FIG. 9 is an enlarged right-side view of a portion of the vehicle-body frame 12 to which the bracket 125 is attached.

The region 125E is generally located higher than a line segment SL1. The line segment SL1 connects the shaft center 141C of the axle 141 of the rear wheel 14R to the shaft center 22C of the crank axle 22 (for example, rotational center RC1). The length of the line segment SL1 indicates the rear/center length.

The region 125F is located lower than the line segment SL1. The region 125D is generally located higher than the line segment SL1. For example, the regions 125F and 125D are not arranged on the line segment SL1. Thus, the regions 125F and 125D do not overlap the line segment SL1.

In a preferred embodiment, as shown in FIG. 9, the front end of each chain stay 301 is curved upwardly near the bracket 125. For example, most of the chain stay 301 extends along the line segment SL1.

In a preferred embodiment, as shown in FIG. 9, the bottom end of the seat tube 124 and the bottom end of the suspension 304 are generally located higher than the line segment SL1.

Figure 10:
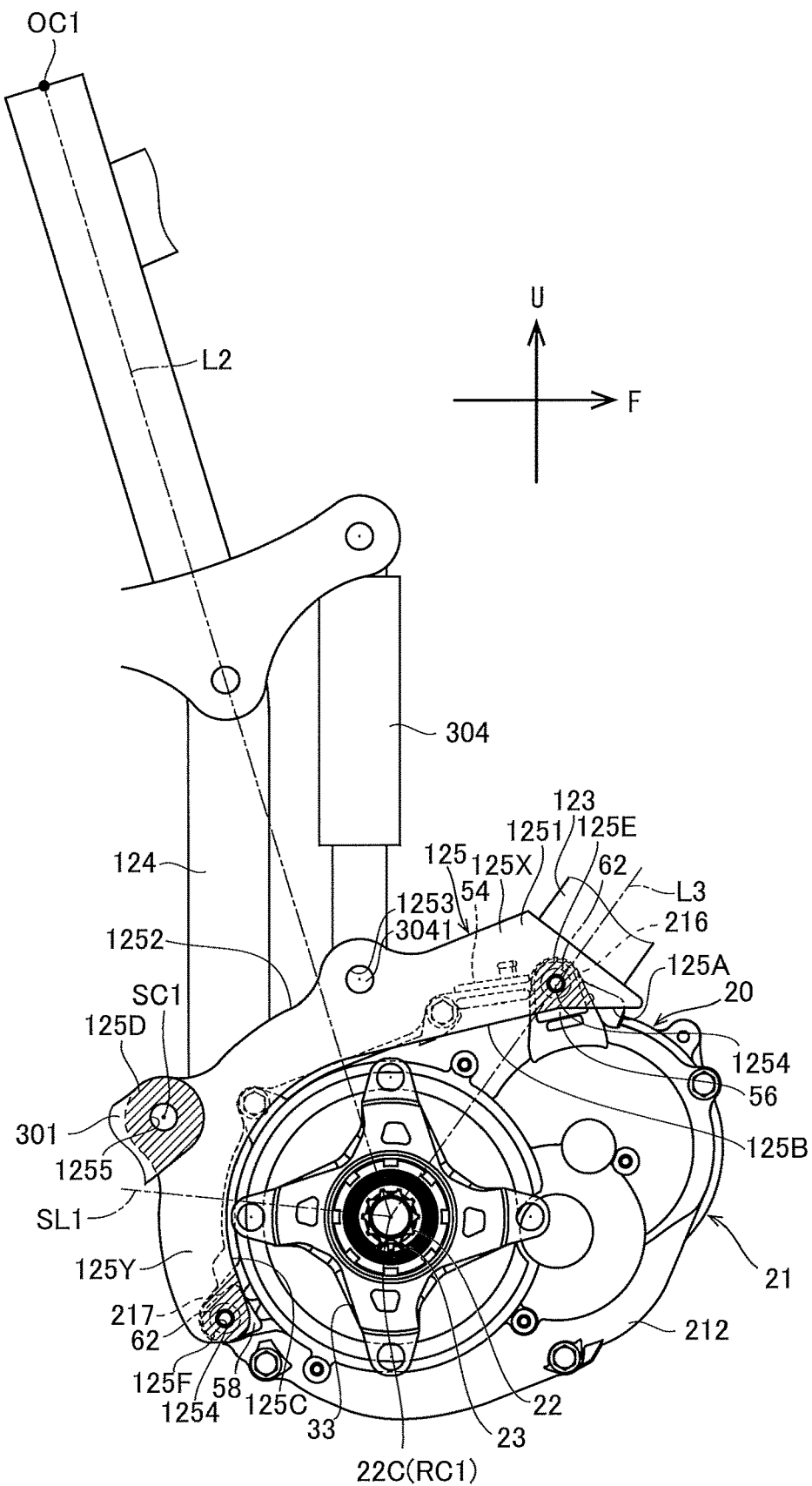
FIG. 10 is an enlarged right-side view of another portion of the vehicle-body frame with the bracket attached thereto.

The positional relationship between the regions 125E and 125F will be described with reference to FIG. 10. FIG. 10 is an enlarged right-side view of another portion of the vehicle-body frame 12 to which the bracket 125 is attached.

The region 125E is generally located forward of a straight line L2. The straight line L2 connects the center of the opening, OC1, on the top end of the seat tube 124 to the shaft center 22C of the crank axle 22. The region 125F is generally located rearward of the straight line L2. The region 125D is generally located rearward of the straight line L2.

In a preferred embodiment, as shown in FIG. 10, the bottom end of the suspension 304 is generally located forward of the straight line L2. The bottom end of the seat tube 124 is generally located rearward of the straight line L2.

Figure 11:
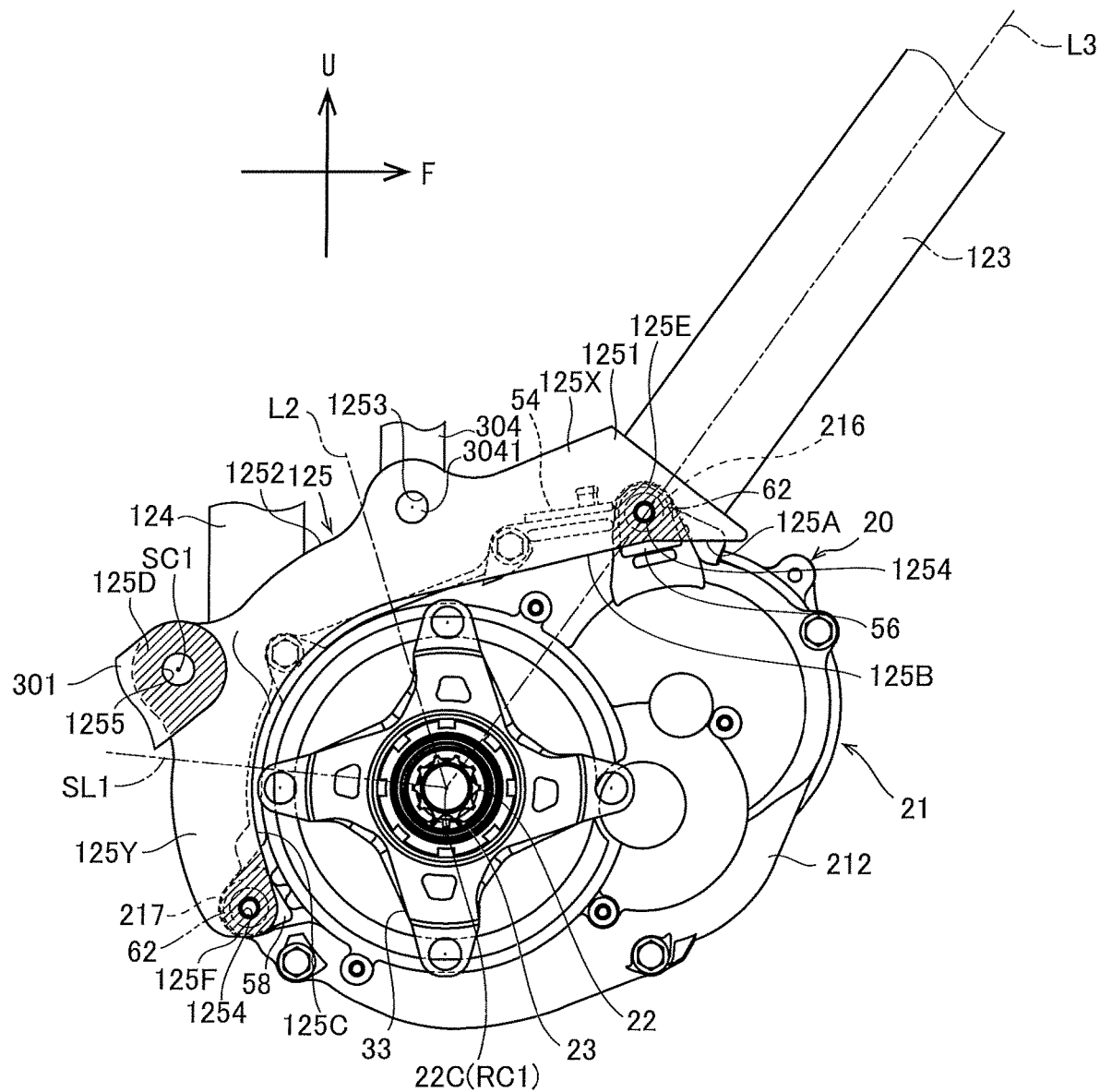
FIG. 11 is an enlarged right-side view of yet another portion of the vehicle-body frame with the bracket attached thereto.

The positional relationship between the regions 125E and 125F will be described with reference to FIG. 11. FIG. 11 is an enlarged right-side view of yet another portion of the vehicle-body frame 12 to which the bracket 125 is attached.

The region 125E is positioned to overlap a straight line L3 as viewed from a side of the vehicle. As viewed from a side of the vehicle, the straight line L3 passes through the shaft center 22C of the crank axle 22 and extends parallel or substantially parallel to the down tube 123. The region 125F is generally located rearward of the straight line L3.

In a preferred embodiment, as shown in FIG. 11, the bottom end of the suspension 304, the bottom end of the seat tube 124 and the region 125D are located rearward of the straight line L3.

In a preferred embodiment, the regions 125D and 125F are not arranged on the line segment SL1. Thus, the attachment portion 217 (for example, bosses 217L and 217R) does not obstruct positioning of the chain stay 301 when attaching the chain stay 301 to the bracket 125. As such, the rear/center length (for example, length of the line segment SL1) is reduced compared with arrangements where the regions 125D and 125F are arranged on the line segment SL1.

In a preferred embodiment, the motor 25 is located forward of the crank axle 22 as viewed from a side of the vehicle. Thus, the rear/center length is reduced compared with arrangements where the motor 25 is located rearward of the crank axle 22.

In a preferred embodiment, the rotational center RC3 of the reduction gear 24 is generally located lower than the straight line L1. Thus, the center of gravity of the drive unit 20 is lowered. Further, a sufficient space that allows the cables 50 to be routed out of the housing 21 is defined in an upper portion of the housing 21 (for example, space located higher than the straight line L1).

The electric-motor-assisted bicycle 10 includes the suspension 304. Thus, the bracket 125 includes a region to which the bottom end of the suspension 304 is connected. In the bracket 125, the region 125E is located in a front portion of the first portion 125X, while the region 125F is located in a rear portion of the second portion 125Y. For example, the region 125E is located in a front end portion of the associated side plate 1251, while the region 125F is located in a rear end portion of the side plate 1251. Thus, providing a region to which the bottom end of the suspension 304 is connected is facilitated.

In a preferred embodiment of the present invention, the grommet 54 is located forward of the crank axle 22 and rearward of the attachment portion 216. Thus, providing regions in the bracket 125 to which the seat tube 124 and suspension 304 are attached is facilitated.

As shown in FIG. 5, the grommet 54 through which the cables 50 are routed out of the housing 21 is located on the top of the housing 21. As shown in FIG. 6, when the drive unit 20 is attached to the bracket 125, the cables 50 (FIG. 5) extending from the drive unit 20 pass through a hole disposed in the bracket 125 and enter the down tube 123. As shown in FIG. 1, the cables 50 are connected to the battery 26 located on the down tube 123 and located higher than the drive unit 20. Thus, the length of the cables 50 is reduced.

Figure 12:
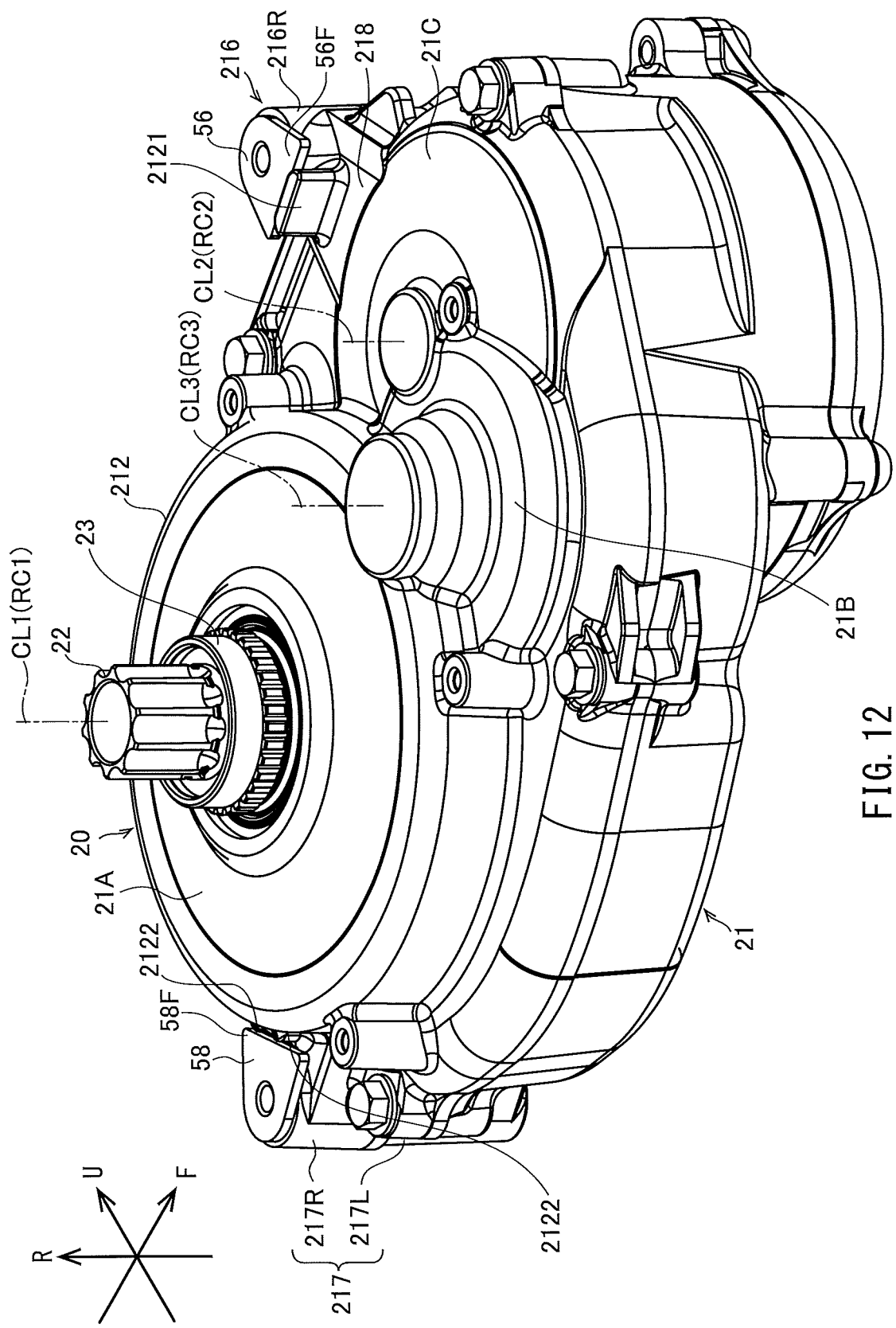
FIG. 12 is a perspective view of the drive unit.

In a preferred embodiment, as shown in FIG. 12, the housing 21 includes a side portion 21A, a side portion 21B and a side portion 21C. FIG. 12 is a perspective view of the drive unit 20. These side portions 21A, 21B and 21C will be described below with reference to FIG. 12.

The side portion 21A is part of the right side of the housing 21. For example, the side portion 21A is part of the right housing 212. The side portion 21A surrounds the crank axle 22. For example, the side portion 21A is preferably annular or substantially annular.

The side portion 21A will be described with reference to FIG. 2. The side portion 21A overlaps the gear 2333 as viewed from a side of the vehicle. In a preferred embodiment, as shown in FIG. 2, the side portion 21A overlaps portions of the gear 2333 that are located inward of the teeth disposed on the periphery of the gear.

The inner periphery of the side portion 21A is located to the right of the outer periphery of the side portion 21A (for example, outward thereof in the left/right direction). For example, the side portion 21A protrudes toward the right (for example, outwardly in the left/right direction) as it extends toward the central axis CL1 of the crank axle 22. The protrusion height of the side portion 21A toward the right (for example, outwardly in the left/right direction) changes at a constant or substantially constant rate along a radial direction of the crank axle 22. For example, the side portion 21A is preferably a convex slope.

Returning to FIG. 12, the side portion 21B is located toward the left of the side portion 21A (for example, inward thereof in the left/right direction). The side portion 21A is located toward the right of the side portion 21B (for example, outward thereof in the left/right direction). The side portion 21B is located outward of the side portion 21A in a direction perpendicular or substantially perpendicular to the central axis CL1 of the crank axle 22 (in a radial direction). The side portion 21B is located forward of the side portion 21A. The side portion 21B extends in a circumferential direction of the reduction gear 24 around the central axis CL3. The inner periphery and outer periphery of the side portion 21B are located at the same position in the left/right direction. For example, the side portion 21B is preferably a flat surface.

The side portion 21B will be described with reference to FIG. 2. The side portion 21B overlaps the reduction gear 24 as viewed from a side of the vehicle. In a preferred embodiment, as shown in FIG. 2, the side portion 21B overlaps the cylindrical portion 242 of the reduction gear 24.

Returning to FIG. 12, the side portion 21C is located toward the left of the side portion 21B (for example, inward thereof in the left/right direction). For example, the side portion 21B is located toward the right of the side portion 21C (for example, outward thereof in the left/right direction). The side portion 21C is located outward of the side portion 21A in a direction perpendicular or substantially perpendicular to the central axis CL1 of the crank axle 22 (for example, in a radial direction thereof). The side portion 21C is located outward of the side portion 21B in a direction perpendicular or substantially perpendicular to the central axis CL2 of the reduction gear 24 (for example, in a radial direction thereof). The side portion 21C extends in a circumferential direction of the rotor 252 around the central axis CL2.

The side portion 21C will be described with reference to FIG. 2. The side portion 21C overlaps the motor 25 as viewed from a side of the vehicle. In a preferred embodiment, as shown in FIG. 2, the outer periphery of the side portion 21C overlaps the stator 251, while the inner periphery of the side portion 21C overlaps the rotor 252.

The inner periphery of the side portion 21C is located to the right of the outer periphery of the side portion 21C (for example, outward in the left/right direction). For example, the side portion 21C protrudes toward the right (for example, outwardly in the left/right direction) as it extends toward the central axis CL2 of the rotor 252. The protrusion height of the side portion 21C toward the right (for example, outwardly in the left/right direction) changes at a rate that decreases as the protrusion extends toward the central axis CL2. For example, the side portion 21C preferably has a dome-shaped slope.

Returning to FIG. 12, the boss 216R of the attachment portion 216 is located outward of the side portion 21C in a direction perpendicular or substantially perpendicular to the central axis CL2 of the rotor 252 (for example, in a radial direction thereof). The right end surface of the boss 216R is located toward the right of the outer periphery of the side portion 21C (for example, outward thereof in the left/right direction).

A connector 218 is located on the right side of the housing 21. The connector 218 protrudes toward the right (for example, outwardly in the left/right direction) from the right side of the housing 21. The connector 218 extends in a radial direction of the rotor 252. The connector 218 connects the side portion 21C to the side (for example, outer periphery) of the boss 216R.

In a preferred embodiment of the present invention, the housing 21 includes a side portion 21A. This arrangement will improve the stiffness of the housing 21.

In a preferred embodiment of the present invention, the housing 21 includes a side portion 21C. This arrangement will improve the stiffness of the housing 21.

In a preferred embodiment of the present invention, the side portions 21A, 21B and 21C are located at different positions in the left/right direction. This arrangement will further improve the stiffness of the housing 21.

In a preferred embodiment of the present invention, the connector 218 is preferably a portion of the right side of the housing 21. This arrangement will further improve the stiffness of the housing 21.

While preferred embodiments of the present invention have been described, the preferred embodiments are merely examples that allow the present invention to be carried out. Thus, the present invention is not limited to the preferred embodiments, and the preferred embodiments may be modified as appropriate without departing from the spirit of the present invention when carried out.

Figure 13:
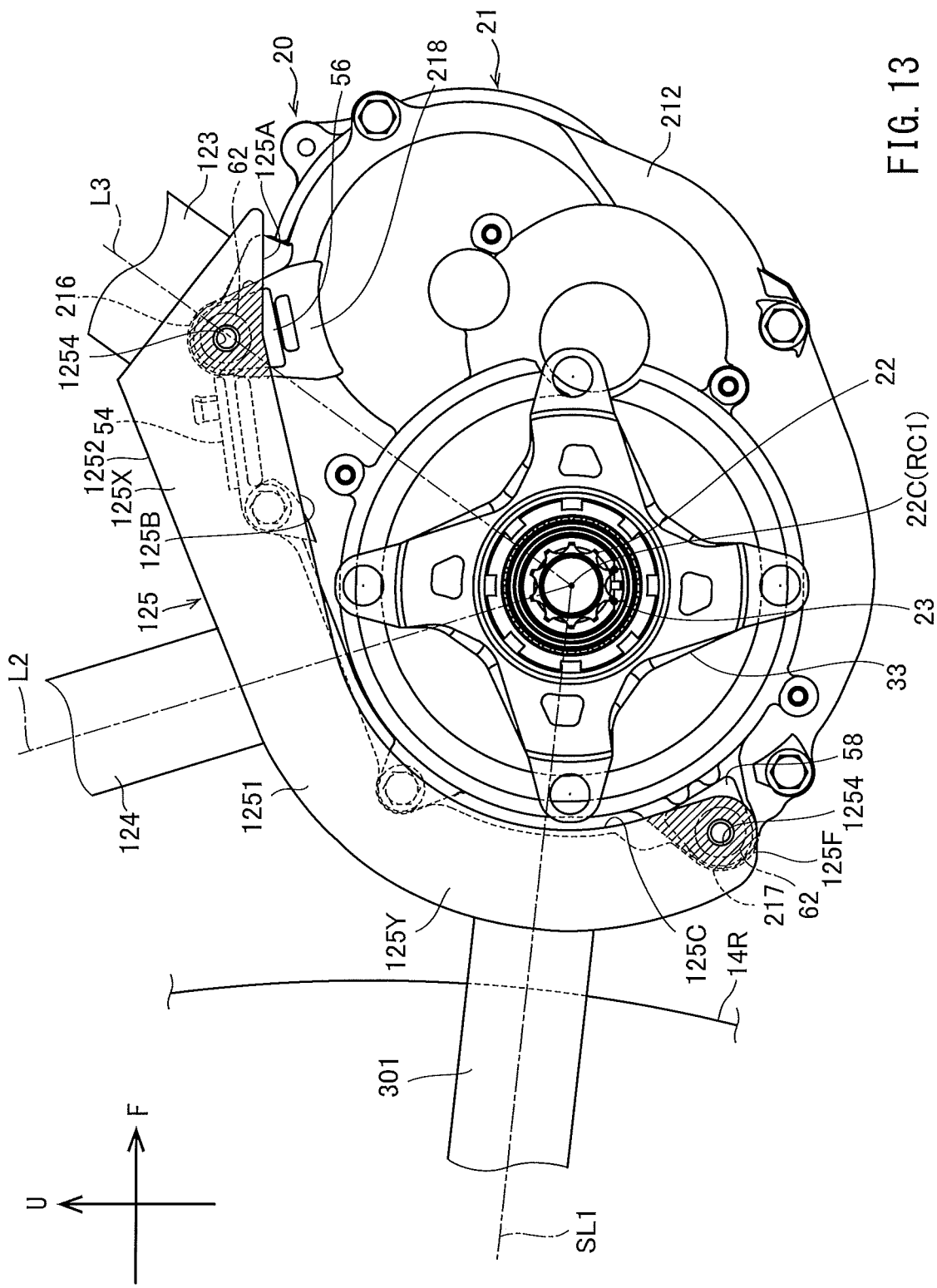
FIG. 13 is a right-side view of a chain stay fixed to the bracket.

For example, a preferred embodiment described above preferably includes the chain stays 301 that are swingably attached to the bracket 125. Alternatively, the chain stays 301 may be fixed to the bracket 125, as shown in FIG. 13. In a preferred embodiment, the region 125F does not overlap the line segment SL1 as viewed from a side of the vehicle. For example, the region of the bracket 125 to which a chain stay 301 is attached and the region 125F are not arranged on the line segment SL1. Thus, the rear/center length may be reduced. In a preferred embodiment, as shown in FIG. 13, the region of the bracket 125 to which the chain stay 301 is attached overlaps the line segment SL1 as viewed from a side of the vehicle. Alternatively, the region may not overlap the line segment SL1.

A preferred embodiment described above preferably includes a drive unit 20 in which the gear 2333 is located on the driven member 2332 of the one-way clutch 233 and a resultant of a human-generated force (for example, pedaling force) and a motor-generated drive force is output. Alternatively, various preferred embodiments of the present invention may be applied to a drive unit in which, instead of the gear 2333 located on the driven member 2332, an auxiliary sprocket located on the rotational shaft of the reduction gear 24 may supply a motor drive force to a midway portion of the chain 36 wound around the driving and driven sprockets 34 and 32.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric-motor-assisted bicycle comprising:
a front wheel;
a rear wheel located rearward of the front wheel;
a vehicle-body frame that supports the front wheel and the rear wheel, and that includes a bracket and a chain stay, which extends rearwardly from the bracket and supports an axle of the rear wheel; and
a drive unit that generates a driving force which is transmitted to the rear wheel, that is attached to the vehicle-body frame and the bracket, and that includes a housing, a crank axle which extends through the housing in a left/right direction of the bicycle, a first coupler, and a second coupler, the first coupler and the second coupler being located on an outer surface of the housing and attaching the housing to the vehicle-body frame; wherein
the chain stay is attached to the bracket at a position rearward of the crank axle in a front/rear direction of the bicycle and extends from the bracket rearwardly to support an axle of the rear wheel;
the first coupler is located forward of the crank axle in the front/rear direction of the bicycle;
the second coupler is located rearward of the crank axle in the front/rear direction of the bicycle; and
a region of the bracket to which the second coupler is attached does not overlap a line segment connecting a shaft center of the axle of the rear wheel to a shaft center of the crank axle as viewed from a side of the bicycle.

2. The electric-motor-assisted bicycle according to claim 1, wherein
the drive unit includes a motor housed in the housing; and
the motor is located forward of the crank axle as viewed from the side of the bicycle.

3. The electric-motor-assisted bicycle according to claim 2, wherein
the drive unit includes:
a crank-rotation input shaft, the crank axle extending into the crank-rotation input shaft, the crank-rotation input shaft including one end coupled to the crank axle;
a resultant-force output shaft, the crank axle extending into the resultant-force output shaft, the resultant-force output shaft being connected to the other end of the crank-rotation input shaft by a one-way clutch; and
a reduction gear housed in the housing that transmits the driving force from the motor to the resultant-force output shaft; and
a rotational center of the reduction gear is located lower than a straight line connecting the shaft center of the crank axle to a rotational center of a rotor of the motor as viewed from the side of the bicycle.

4. The electric-motor-assisted bicycle according to claim 2, wherein
the housing includes a convex section overlapping a portion of the motor as viewed from the side of the bicycle; and
the convex section protrudes outwardly in the left/right direction of the bicycle such that a protrusion height in the left/right direction of the bicycle increases toward a rotational center of a rotor of the motor.

5. The electric-motor-assisted bicycle according to claim 4, wherein
the second coupler includes a boss located outward of the convex section in a radial direction of the rotor as viewed from the side of the bicycle, the boss protruding from the housing in a left/right direction of the bicycle; and
the housing includes a connector protruding from the housing in a left/right direction of the bicycle, extending in a direction perpendicular or substantially perpendicular to an axis of a rotational center of the rotor, and connecting the convex section to an outer surface of the boss.

6. The electric-motor-assisted bicycle according to claim 2, wherein
the drive unit includes:
a crank-rotation input shaft extending into the crank-rotation input shaft, the crank-rotation input shaft including one end coupled to the crank axle;
a resultant-force output shaft, the crank axle extending into the resultant-force output shaft, the resultant-force output shaft being connected to the other end of the crank-rotation input shaft by a one-way clutch; and
a reduction gear housed in the housing that transmits the driving force from the motor to the resultant-force output shaft;
the resultant-force output shaft includes a driven gear that engages the reduction gear;
the housing includes a convex section overlapping a portion of the driven gear as viewed from the side of the bicycle; and
the convex section protrudes outwardly in the left/right direction of the bicycle such that a protrusion height in the left/right direction of the bicycle increases toward a rotational center of the crank axle.

7. The electric-motor-assisted bicycle according to claim 1, further comprising:
a saddle; and
a seat post that supports the saddle; wherein
the vehicle-body frame includes a seat tube attached to the bracket, the seat tube extending upwardly from the bracket, the seat post extending into the seat tube;
the first coupler is located forward of a reference line connecting the shaft center of the crank axle to a center of an opening on a top end of the seat tube as viewed from the side of the bicycle; and the second coupler is located rearward of the reference line as viewed from the side of the bicycle.

8. The electric-motor-assisted bicycle according to claim 1, further comprising:

a battery that supplies electric power to the drive unit; wherein the housing includes an outlet opening upward and allowing a cable that is connected to a substrate housed in the housing to be routed out of the housing; and the battery is located higher than the outlet.

9. The electric-motor-assisted bicycle according to claim 8, wherein the outlet is located forward of the shaft center of the crank axle and rearward of the first coupler in the front/rear direction of the bicycle.

10. The electric-motor-assisted bicycle according to claim 1, wherein the region of the bracket to which the second coupler is attached is located lower than the line segment as viewed from the side of the bicycle; and a region of the bracket to which the chain stay is attached is located higher than the line segment as viewed from the side of the bicycle.

11. The electric-motor-assisted bicycle according to claim 1, wherein the first coupler is located higher than the crank axle.

12. The electric-motor-assisted bicycle according to claim 1, wherein the first coupler is located higher than the crank axle;

the bracket includes a left side plate, a right side plate, and a top plate;

each of the left side plate and the right side plate extends in the front/rear direction of the bicycle and a top/bottom direction of the bicycle;

the left side plate and the right side plate are spaced apart from each other in the left/right direction of the bicycle;

the left side plate extends downwardly from a left edge of the top plate; and the right side plate extends downwardly from a right edge of the top plate.

13. An electric-motor-assisted bicycle comprising:

a front wheel;

a rear wheel located rearward of the front wheel;

a vehicle-body frame that supports the front wheel and the rear wheel, and that includes a bracket and a chain stay, which extends rearwardly from the bracket and supports an axle of the rear wheel; and a drive unit that generates a driving force which is transmitted to the rear wheel, that is attached to the vehicle-body frame and the bracket, and that includes a housing, a crank axle which extends through the housing in a left/right direction of the bicycle, a first coupler, and a second coupler, the first coupler and the second coupler being located on an outer surface of the housing and attaching the housing to the vehicle-body frame; wherein the chain stay is attached to the bracket at a position rearward of the crank axle in a front/rear direction of the bicycle and extends from the bracket rearwardly to support an axle of the rear wheel;

the first coupler is located forward of the crank axle in the front/rear direction of the bicycle;

the second coupler is located rearward of the crank axle in the front/rear direction of the bicycle;

at least one of a region of the bracket to which the chain stay is attached and a region of the bracket to which the second coupler is attached does not overlap a line segment connecting a shaft center of the axle of the rear wheel to a shaft center of the crank axle as viewed from a side of the bicycle;

the drive unit includes a motor housed in the housing;

the motor is located forward of the crank axle as viewed from the side of the bicycle;

the drive unit includes:

a crank-rotation input shaft extending into the crank-rotation input shaft, the crank-rotation input shaft including one end coupled to the crank axle;

a resultant-force output shaft, the crank axle extending into the resultant-force output shaft, the resultant-force output shaft being connected to the other end of the crank-rotation input shaft by a one-way clutch; and a reduction gear housed in the housing that transmits the driving force from the motor to the resultant-force output shaft;

the resultant-force output shaft includes a driven gear that engages the reduction gear; and the housing includes:

a first side portion overlapping a portion of the motor as viewed from the side of the bicycle;

a second side portion overlapping a portion of the reduction gear and located outward of the first side portion in the left/right direction of the bicycle as viewed from the side of the bicycle; and a third side portion overlapping a portion of the driven gear and located outward of the second side portion in the left/right direction of the bicycle as viewed from the side of the bicycle.

14. An electric-motor-assisted bicycle comprising:

a front wheel;

a rear wheel located rearward of the front wheel;

a vehicle-body frame that supports the front wheel and the rear wheel, and that includes a bracket, a chain stay which extends rearwardly from the bracket and supports an axle of the rear wheel, and a seat tube attached to the bracket, the seat tube extending upwardly from the bracket;

a drive unit that is attached to the vehicle-body frame and the bracket, that generates a driving force, which is transmitted to the rear wheel, and that includes a housing, a crank axle, which extends through the housing in a left/right direction of the bicycle, a first coupler, and a second coupler, the first coupler and the second coupler being located on an outer surface of the housing and attaching the housing to the vehicle-body frame;

a saddle located higher than the drive unit;

a seat post that supports the saddle and that extends into the seat tube; and a battery that supplies electric power to the drive unit; wherein the housing of the drive unit includes an outlet that opens upward and allows a cable that is connected to a substrate housed in the housing to be routed out of the housing;

the battery is located higher than the outlet;

the outlet is located forward of a shaft center of the crank axle and rearward of the first coupler in a front/rear direction of the bicycle;

the chain stay is attached to the bracket at a position rearward of the crank axle in the front/rear direction of the bicycle and extends rearwardly to support an axle of the rear wheel;

the first coupler is located forward of a position on the bracket to which the seat tube is attached as viewed from a side of the bicycle;

the second coupler is located rearward of the position on the bracket to which the seat tube is attached as viewed from the side of the bicycle;

a region of the bracket to which the chain stay is attached is different from a region of the bracket to which the second coupler is attached as viewed from the side of the bicycle;

a region of the bracket to which the first coupler is attached and the region of the bracket to which the second coupler is attached are the only regions of the bracket to which the drive unit is attached;

the region of the bracket to which the first coupler is attached, the outlet of the housing, the region of the bracket to which the chain stay is attached, and the region of the bracket to which the second coupler is attached are arranged in order in a direction in which the bracket extends as viewed from the side of the bicycle;

the substrate surrounds the crank axle when viewed in an axial direction of the crank axle; and the substrate has a shape of a "C" when viewed in the axial direction of the crank axle.

15. The electric-motor-assisted bicycle according to claim 14, wherein the first coupler is only attached to the bracket in the region of the bracket to which the first coupler is attached, and the second coupler is only attached to the bracket in the region of the bracket to which the second coupler is attached.

* * * * *